(12) United States Patent
Sato et al.

(10) Patent No.: US 6,810,445 B1
(45) Date of Patent: Oct. 26, 2004

(54) DATA TRANSFER CONTROL DEVICE AND ELECTRONIC EQUIPMENT

(75) Inventors: Daisuke Sato, Suwa (JP); Hiroshi Horiuchi, Matsumoto (JP)

(73) Assignee: Seiko Espon Corporation, Tokyo (JP)

( * ) Notice: Subject to any disclaimer, the term of this patent is extended or adjusted under 35 U.S.C. 154(b) by 919 days.

(21) Appl. No.: 09/685,139

(22) Filed: Oct. 11, 2000

(30) Foreign Application Priority Data

Oct. 15, 1999 (JP) .......................................... 11-293588

(51) Int. Cl.[7] .......................................... G06F 13/00
(52) U.S. Cl. .......................... 710/33; 710/52; 711/206
(58) Field of Search .............................. 710/52, 53, 54, 710/22, 33; 711/206

(56) References Cited

U.S. PATENT DOCUMENTS

| | | | | |
|---|---|---|---|---|
| 4,993,846 A | * | 2/1991 | Diamond et al. ............ | 383/127 |
| 5,522,045 A | * | 5/1996 | Sandberg ..................... | 709/215 |
| 5,602,995 A | | 2/1997 | Hendel et al. ............... | 395/250 |
| 6,678,722 B1 | * | 1/2004 | Kanoh ......................... | 709/212 |

FOREIGN PATENT DOCUMENTS

| | | | | |
|---|---|---|---|---|
| EP | 0 684 719 A1 | 11/1995 | ........... | H04L/29/06 |
| EP | 0 851 353 A1 | 7/1998 | ........... | G06F/12/02 |
| JP | A 10-178438 | 6/1998 | | |
| JP | A 11-224220 | 8/1999 | | |

OTHER PUBLICATIONS

"1394 Bridge Controller, INIC–1410: ATA/ATAPI IDE to IEEE 1394 Bridge Controller Solution"; Taking Data Further. ™; Initio Corporation; Feb. 1, 2000.

"SAA7356HL, p1394a Compatibility Asynchronous Link Layer Controller"; Philips Semiconductors Co., Ltd., 1999, No date/month.

http://www.oxsemi.com/products/main.html; "Latest product—the OXFW900", 1999, No date/month.

"IEEE1394LSI for SBP–2"; Others for MOSLSI; MN8644002; Panasonic, No date provided.

"IEEE1394LSI for SBP–2"; MN864400; Panasonic, No date provided.

"System LSI for IEEE1394"; Tadahiro Yoshida, Sachio Arima, Shiro Nozaki, Hiroshi Yamada, and Susumu Ikeda; Matsushita technical Journal; vol. 45, No. 2; Apr. 1999.

* cited by examiner

Primary Examiner—Fritz Fleming
Assistant Examiner—Alan Chen
(74) Attorney, Agent, or Firm—Oliff & Berridge, PLC

(57) ABSTRACT

A data transfer control device and electronic equipment that make it possible to implement high-speed data transfer while observing restriction that prevent the traversing of page boundaries. A data transfer control device that conforms to the IEEE 1394 standard comprises a page table fetch circuit for fetching a page table from another node if a page table exists in a data buffer at the initiator, a page table creation circuit for creating a virtual page table if no page table exists, and an SBP-2 core for automatically dividing transfer data into a series of packets that do not traverse page boundaries based on the thus fetched or created page table and transmitting them. The page table creation circuit creates a page table in which a portion between a start address and a Kth page boundary is an X-type page table element, a portion between the Kth and Lth page boundaries is a Y-type page table element, and a portion between the Lth page boundary and an end address is a Z-type page table element.

20 Claims, 29 Drawing Sheets

F I G. 1
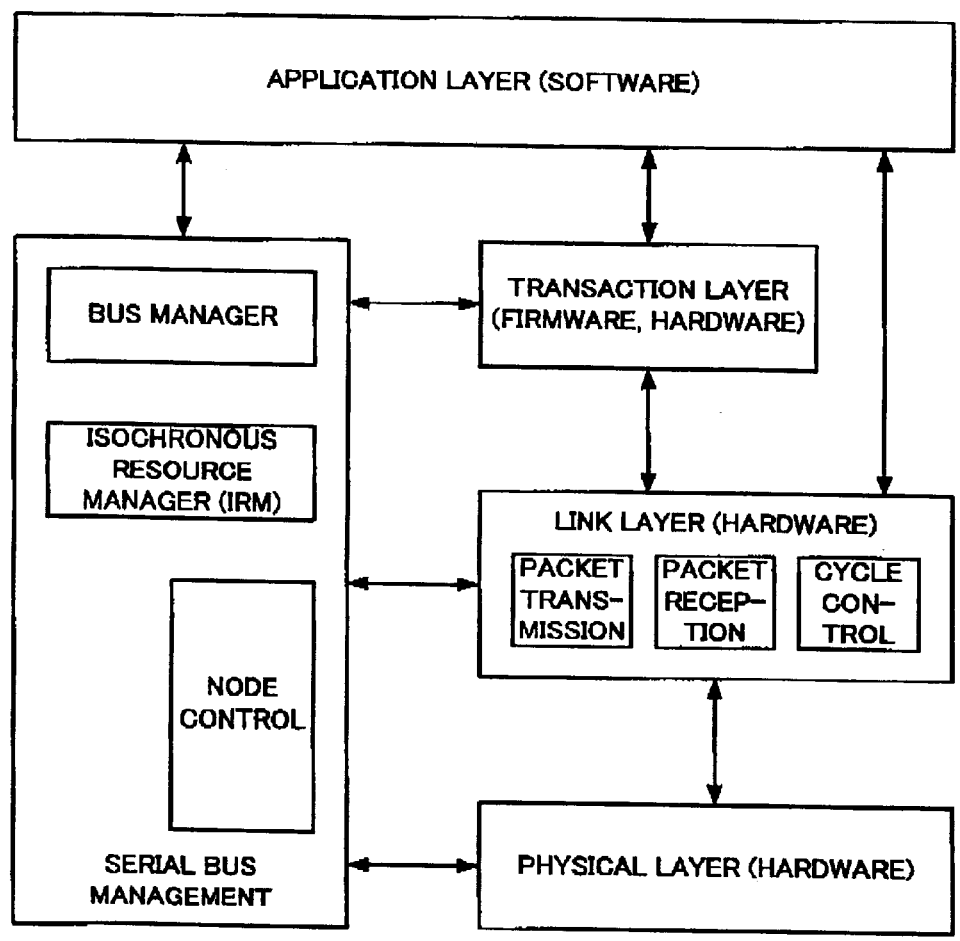

F I G. 3
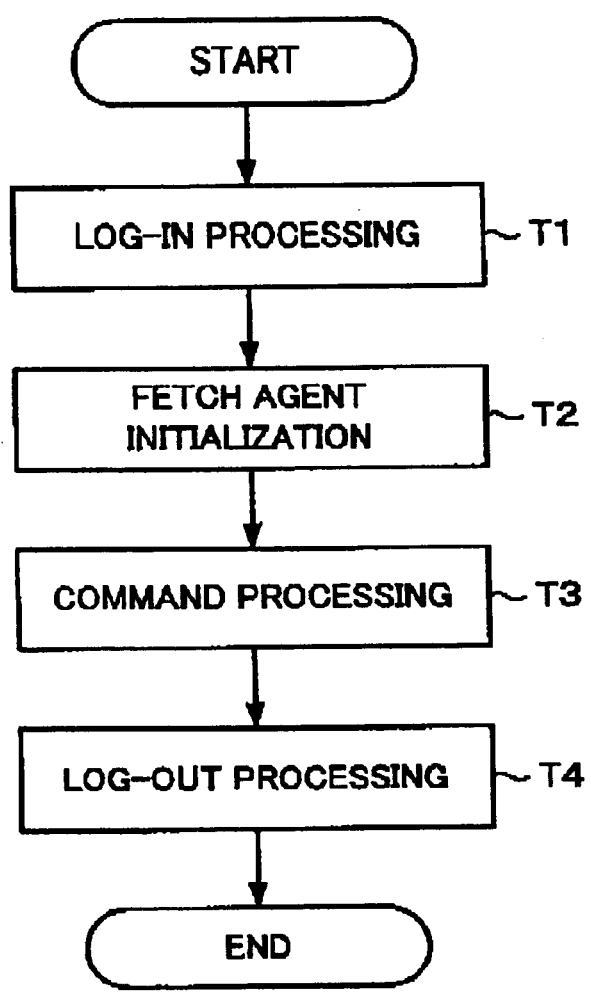

F I G. 4
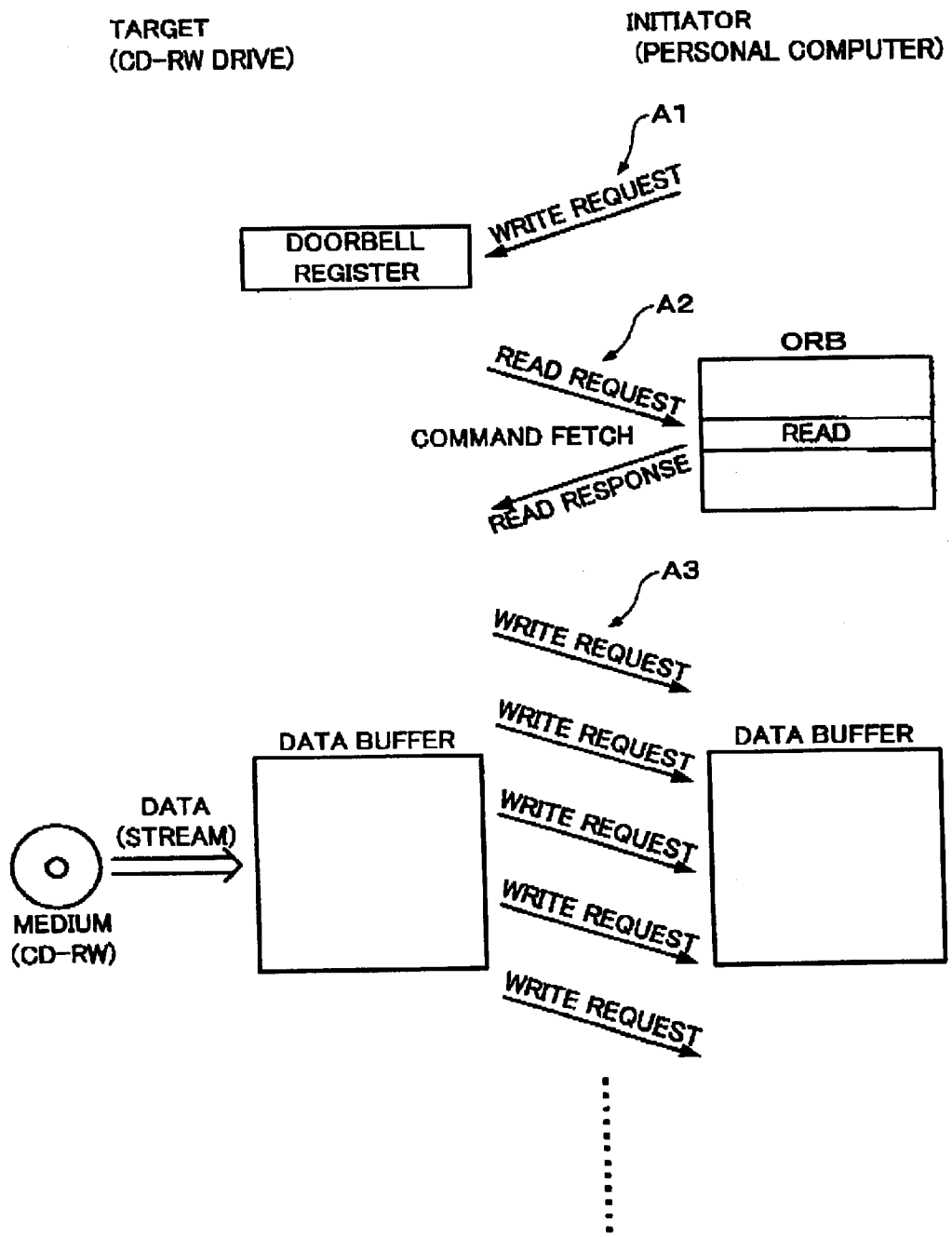

WHEN A PAGE TABLE EXISTS

WHEN NO PAGE TABLE EXISTS

RAM (PACKET STORAGE MEANS)

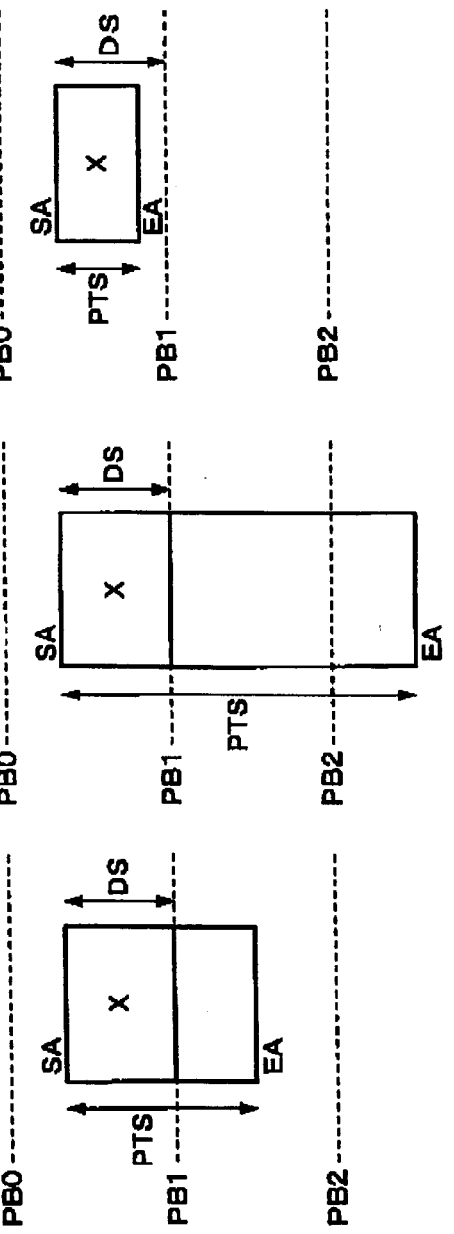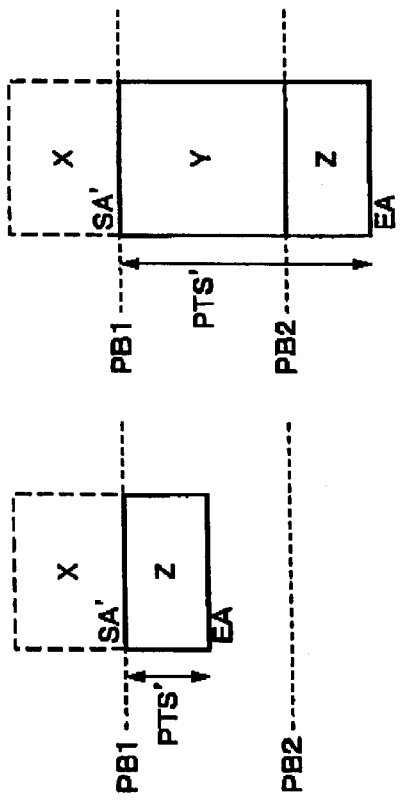

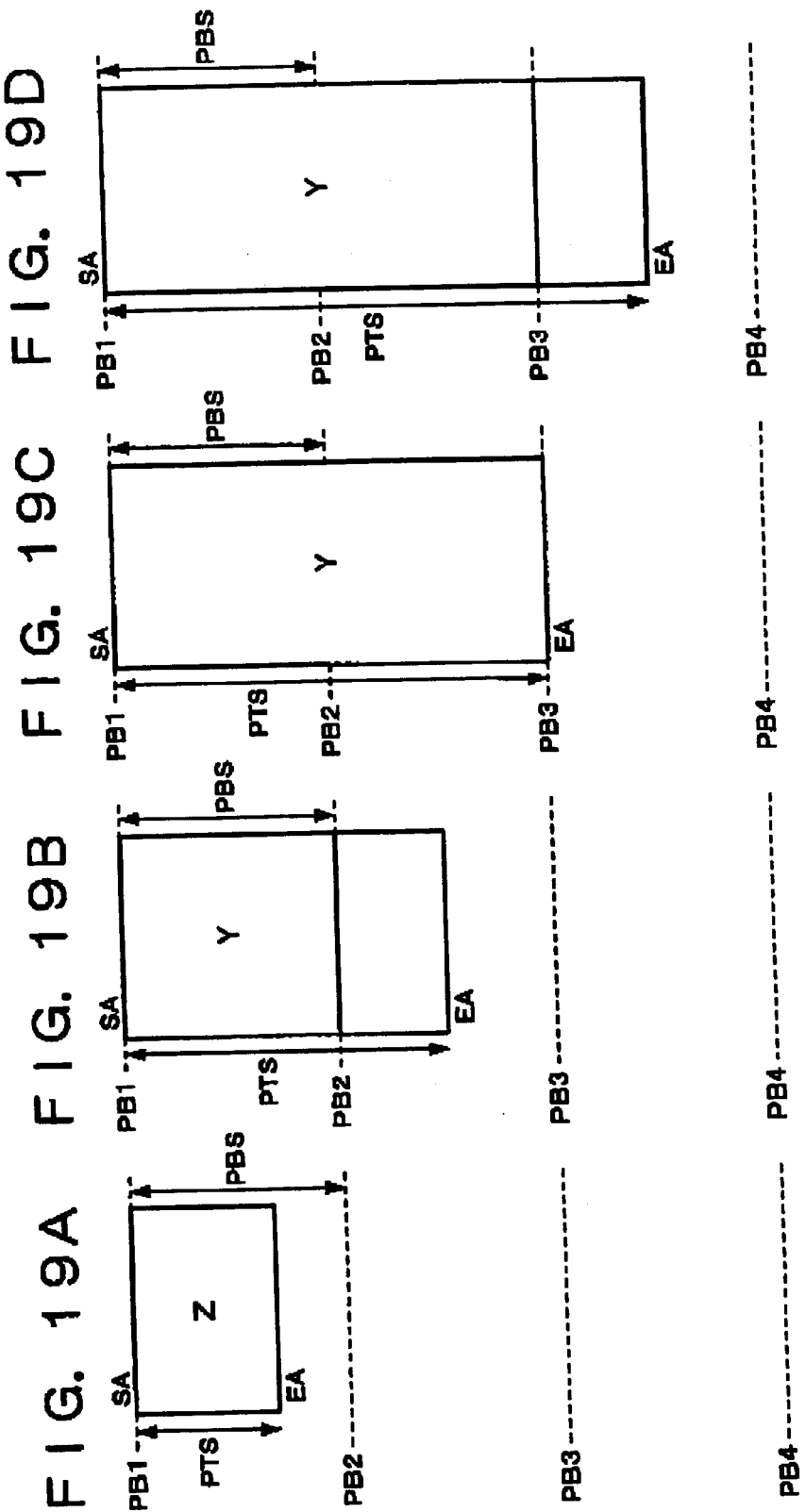

tl (TRANSACTION LABEL)

RAM (PACKET STORAGE MEANS)

DATA TRANSFER CONTROL DEVICE AND ELECTRONIC EQUIPMENT

BACKGROUND OF THE INVENTION

1. Field of the Invention

The present invention relates to a data transfer control device and electronic equipment comprising the same, and, in particular, to a data transfer control device that enables data transfer in accordance with the IEEE 1394 standard between a plurality of nodes connected to a bus, and electronic equipment comprising the same.

2. Description of Related Art

An interface standard called IEEE 1394 has recently been attracting much attention. This IEEE 1394 has standardized high-speed serial bus interfaces that can handle the next generation of multimedia devices. IEEE 1394 makes it possible to handle data that is required to have real-time capabilities, such as moving images. A bus in accordance with IEEE 1394 can be connected not only to peripheral equipment for computers, such as printers, scanners, CD-RW drives, and hard disk drives, but also to domestic appliances such as video cameras, VTRs, and TVs. This standard is therefore expected to enable a dramatic acceleration of the digitalization of electronic equipment.

However, some technical problems have been identified with such a data transfer control device conforming to IEEE 1394, as described below.

That is to say, the current IEEE 1394 standard does make it possible to implement transfer speeds up to a maximum of 400 Mbps. In practice, however, the presence of overhead processing forces the actual transfer speeds of the entire system to be much slower. In other words, the firmware (processing means) running on a CPU require large amounts of time for processes such as preparing for transmitting data, dividing transfer data into packets, and issuing the transfer start command, which means it is not possible to implement high-speed data transfer overalls no matter how fast the data can be transferred over the buses.

A particular problem lies in the fact that a CPU incorporated into peripheral equipment has a lower processing capability than the CPU incorporated into the host system, such as a personal computer. This makes the problem of overhead processing in the firmware and application software extremely serious. It is therefore desirable to provide techniques that are capable of efficiently solving this overhead problem.

In addition, when data is transferred between an initiator (host) such as a personal computer and a target (device) such as a CD-RW drive or printer, there are restrictions that prohibit data transfers that exceed page boundaries within a data buffer (storage means) on the initiator side. If the initiator has specified addresses by an indirect addressing method using a page table, it is not particularly necessary for the target side to consider such restrictions. If the initiator has specified addresses by a direct addressing method, however, a problem is raised in that the target side has to perform data transfers while observing such restrictions.

SUMMARY OF THE INVENTION

The present invention was devised in the light of the above described technical problems, and has as an objective thereof the provision of a data transfer control device that makes it possible to implement high-speed data transfer while observing the restriction on traversing page boundaries, regardless of the existence/nonexistence of a page table, and electronic equipment that uses the same.

In order to solve the above described technical problems, according to a first aspect of the present invention, there is provided a data transfer control device for transferring data among a plurality of nodes that are connected to a bus. The data transfer control device comprises:

a page table fetch circuit that operates when a page table exists in a storage means of another node, to fetch the page table from the other node;

a page table creation circuit that operates when no page table exists in a storage means of the other node, to create a virtual page table based on page boundary information; and a transfer execution circuit which executes processing to divide transfer data into packets that do not traverse page boundaries, based on the thus fetched or created page table, and transmit the packets.

With this aspect of the invention, if a page table exists in the storage means of the other node, that page table is fetched; if no page table exists in the storage means of the other node, a virtual page table is created. The thus fetched or created page table is then used to divide transfer data into packets that do not traverse page boundaries, for transmission. With this aspect of the invention configured as described above, data can be transferred even if no page table exists, using a created virtual page table, so that the transfer execution processing after the page table has been fetched or created can be made common. In other words, data can be transferred by the same transfer execution processing, regardless of whether or not a page table exists. This simplifies the processing and makes the circuitry more compact. Since data is transmitted by using a virtual page table if no page table exists, this aspect of the invention makes it possible to implement high-speed data transfer while observing the restriction on traversing page boundaries of the storage means of the other node.

When a processing means has issued a transfer start command, the page table fetch circuit may execute processing to automatically fetch a page table or the page table creation circuit may execute processing to automatically create a page table; and the transfer execution circuit may execute processing to automatically divide transfer data equivalent of a page table into a series of packets and transfer the thus-divided series of packets continuously. This ensures that, when the processing means issues a transfer start command, the page table is automatically fetched or created, transfer data equivalent of a page-table is automatically divided into a series of packets, and those packets are transmitted. This therefore enables a huge reduction in the processing load on the processing means such as firmware, enabling a large increase in the actual transfer speed of data.

The data transfer control device may further comprise a payload division circuit for dividing transfer data into packets of a payload size, based on page table element information possessed by a page table. This ensures that the payload division of packets is also done automatically by the hardware, thus making it possible to further reduce the processing load on the processing means such as firmware.

The data transfer control device may further comprise randomly accessible packet storage means having a control information area for storing packet control information and a data area for storing packet data, wherein the data area of the packet storage means is separated into a first data area for storing first data for a first layer and a second data area for storing second data for a second layer that is the object of continuous packet transfer by the transfer execution circuit. This ensures that packet control information (such as headers and footers) is stored in a control information area, first data of the packet (such as data for the transaction layer) is stored in a first data area, and second data of the packet (such as data for the application layer) is stored in a second data area. This configuration makes it possible to read the second data out sequentially from the second data area and transmit it to the second layer. This makes it possible to transfer data even faster.

Note that the first data in accordance with the present invention is preferably command data used by the protocol of the first layer and the second data is preferably data used by the application layer.

When a request packet for starting a transaction is transmitted to another node, instruction information for instructing the processing to be performed when a response packet will be received from the other node may be comprised within transaction identification information in the requests packet; and when the response packet is received from the other node, control information and first and second data of the response packet may respectively be written to the control information area and the first and second data areas, based on the instruction information in the transaction identification information in the response packet. This configuration ensures that, when a response packet is sent in from the responding node, the control information and first and second data within the response packet can be automatically written to the areas specified by the instruction information, without involving the processing means such as firmware. This makes it possible to greatly reduce the processing load on the processing means.

The data transfer control device may further comprise randomly accessible packet storage means, wherein the packet storage means comprises a page table area in which a fetched page table is stored when a page table has been fetched, or a created page table is stored when a page table has been created. This configuration makes it possible for the transfer execution circuit to execute the data transfer based on a page table stored in the page table area, without having to know whether the page table was fetched or created.

The data transfer control device may further comprise a page table site register for indicating the size of a fetched page table when a page table has been fetched, or the size of a created page table when a page table has been created. This configuration makes it possible for the transfer execution circuit to use a page table size stored in the page table register when performing desired processing, without having to know whether the page table was fetched or created.

According to a second aspect of the present invention, there is provided a data transfer control device for transferring data among a plurality of nodes that are connected to a bus. The data transfer control device comprises: a page table creation means for creating a page table having a predetermined number of page table elements between Kth and Lth page boundaries of a storage means of another node, when the start address of transfer data lies between (K−1)th and Kth page boundaries or on the Kth page boundary and when the end address of the transfer data lies between Lth and (L+1)th page boundaries or on the Lth page boundary; and transfer execution means for executing processing to divide transfer data into packets that do not traverse page boundaries, based on the thus created page table, and transmit the packets.

In accordance with this aspect of the invention, a page table having a predetermined number of page table elements (preferably 1) between the Kth and Lth page boundaries is created. The thus created page table is used to divide transfer data into packets that do not traverse page boundaries, for transmission. It is therefore possible to restrict the page table size to a minimum size, enabling savings in the amount of storage used for the area that holds the page table. It is also possible to implement high-speed data transfer while observing the restriction on traversing page boundaries.

The data transfer control device may further comprise a payload division means for dividing transfer data into packets of a payload size, the maximum value of which is divisor of the page boundary size. If the maximum payload size is made to be a divisor of the page boundary size in this manner, it becomes possible to transmit data rapidly while observing the restriction on traversing page boundaries, even if the page table is created in such a manner that there is a predetermined number of page table elements between the Kth and Lth page boundaries.

The page table creation means may create a page table such that, when the start address of transfer data is between the (K−1)th and Kth page boundaries and the end address of the transfer data is between the Lth and (L+1)th page boundaries, a portion between the start address and the Kth page boundary is a first page table element, a portion between the Kth and Lth page boundaries is a second page table element, and a portion between the Lth page boundary and the end address is a third page table element. This ensures that the maximum number of page table elements is three, which makes it possible to restrain the page table size to a minimum size.

The page table creation means may create a page table such that, when the start address of transfer data is between the (K−1)th and Kth page boundaries and the end address of the transfer data is between the (K−1)th and Kth page boundaries or on the Kth page boundary, a portion between the start address and the end address is a first page table element. This configuration makes it possible to restrain the number of page table elements to 1 when the start address of the transfer data is between the (K−1)th and Kth page boundaries and the end address of the transfer data is either between the (K−1)th and Kth page boundaries or on the Kth page boundary.

The page table creation means may create a page table such that, when the start address of transfer data is between the (K−1)th and Kth page boundaries and the end address of the transfer data is beyond the Kth page boundary, a portion between the start address and the Kth page boundary is a first page table element, and subsequent page table elements are processed assuming that the start address lies on the Kth page boundary. This makes it possible for subsequent processing to proceed in common, regardless of whether or not the start address lies on the Kth page boundary, simplifying the processing.

The data transfer according to this invention may be performed in accordance with the IEEE 1394 standard.

According to a third aspect of the present invention, there is provided electronic equipment comprising: any one of the above described data transfer control devices; a device for performing given processing on data that has been received from another node via the data transfer control device and the bus; and a device for outputting or storing data that has been subjected to the processing. According to a fourth aspect of the present invention, there is provided electronic equipment comprising: any one of the above described data transfer control devices; a device for performing given processing on data that is to be transferred to another node via the data transfer control device and the bus; and a device for fetching data to be subjected to the processing.

With these aspects of the invention, it is possible to speed up the processing performed within the electronic equipment for outputting or storing data that has been transferred from another node, or the processing performed within the electronic equipment on data that has been fetched thereby and is to be transferred to another node. These aspects of the invention also make it possible to make the data transfer control device more compact and also reduce the processing loads on firmware that controls the data transfer, thus making it possible to produce electronic equipment that is less expensive and more compact.

BRIEF DESCRIPTION OF THE DRAWINGS

FIG. 1 shows the layer structure of IEEE 1394.

FIG. 3 is illustrative of the concept of data transfer processing under SBP-2.

FIG. 4 is illustrative of command processing when data (a data stream) is transferred from a target to an initiator.

FIGS. 18A, 18B, 18C, 18D, and 18E illustrate techniques for creating page table elements.

FIGS. 19A, 19D, 19C, and 19D also illustrate techniques for creating page table elements.

DETAILED DESCRIPTION OF THE PREFERRED EMBODIMENT

Preferred embodiments of this invention are described below with reference to the accompanying drawings.

1. IEEE 1394

The description first relates to an outline of IEEE 1394.

1.1 Outline

The IEEE 1394 standard (IEEE 1394-1995, P1394.a) enables high-speed data transfer at 100 to 400 Mbps (P1394.b concerns 800 to 3,200 Mbps). It also permits the connection of nodes of different transfer speeds to the same bus.

The nodes are connected in a tree configuration in which a maximum of 63 nodes can be connected to one bus. Note that the use of bus bridges enables the connection of approximately 64,000 nodes.

IEEE 1394 provides for asynchronous transfer and isochronous transfer as packet transfer methods. In this case, asynchronous transfer is suitable for data transfers where reliability is required and isochronous transfer is suitable for transfers of data such as moving images and audio, where real-time capabilities are required.

1.2 Layer Structure

The layer structure (protocol structure) covered by IEEE 1394 is shown in FIG. 1.

The IEEE 1394 protocol comprises a physical layer, a link layer, and a transaction layer. The serial bus management function monitors and controls the physical layer, link layer, and transaction layer, and provides various functions for controlling nodes and managing bus resources.

The transaction layer provides an interface (service) for upper layers at each transaction, and executes transactions such as read transactions, write transactions, and lock transactions through the interface provided by the lower link layer.

In this case, a read transaction causes data to be transmitted from the responding node to the node that requested the data. Similarly, a write transaction causes data to be transmitted from the requesting node to the responding node. A lock transaction causes data to be transmitted from the requesting node to the responding node, and the responding node then processes that data and returns it to the requesting node.

The link layer provides functions such as addressing, data check, data framing for packet transmission/reception, and cycle control for isochronous transfer.

The physical layer converts the logical symbols used by the link layer into electrical signals, performs bus arbitration, and defines the physical bus interface.

1.3 SBP-2

Figure 2:
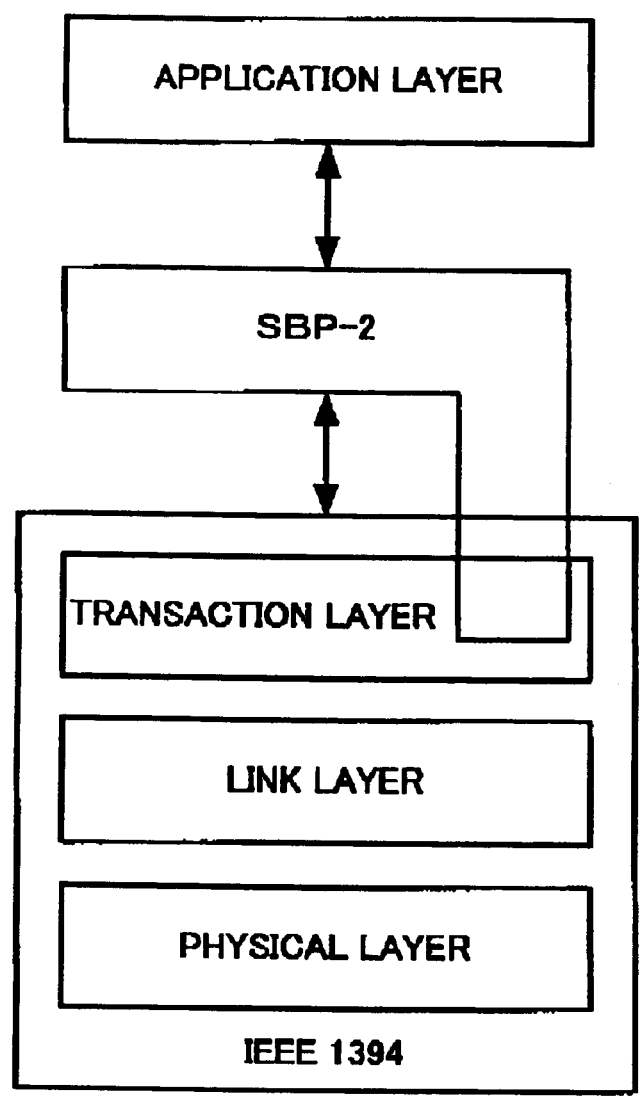
FIG. 2 is illustrative of the SBP-2.

A protocol called the serial bus protocol 2 (SBP-2) has been proposed as a higher-order protocol that comprises some of the functions of the transaction layer under IEEE 1394, as shown in FIG. 2.

In this case, SBP-2 is proposed in order to enable utilization of the SCSI command set on the IEEE 1394 protocol.

Use of this SBP-2 minimizes the changes to be made to the SCSI command set that is used in electronic equipment that conforms to the existing SCSI standards, but enables use in electronic equipment that conforms to the IEEE 1394 standard. The design and development of electronic equipment can be simplified thereby. Since it is also possible to encapsulate device-specific commands, not just SCSI commands, this increases the universality of the command set.

With SBP-2, log-in processing is done by first using a log-in operation request block (ORB) created by an initiator (such as a personal computer), as shown in FIG. 3 (step T1). A dummy ORB is then used to initialize a fetch agent (step T2). A command is executed by using a normal command ORB (step T3), and finally log-out processing is done by a log-out ORB (step T4).

During the command processing of step T3, the initiator transmits a write request packet (executes a write request transaction) to ring a doorbell register of the target, as shown at A1 in FIG. 4. When that happens, the target transmits a read request packet and the initiator returns a read response packet, as shown at A2. This causes the ORB created by the initiator (a normal command ORB) to be fetched into a data buffer at the target. The target analyzes any commands comprised within the fetched ORB.

If a command comprised within the ORB is a SCSI read command, the target transmits a series of write request packets to the initiator, as shown at A3. This causes the transmission of data, such as data (a data stream) that has been read out from a medium (CD-RW) at the target, to a data buffer in the initiator.

Figure 5:
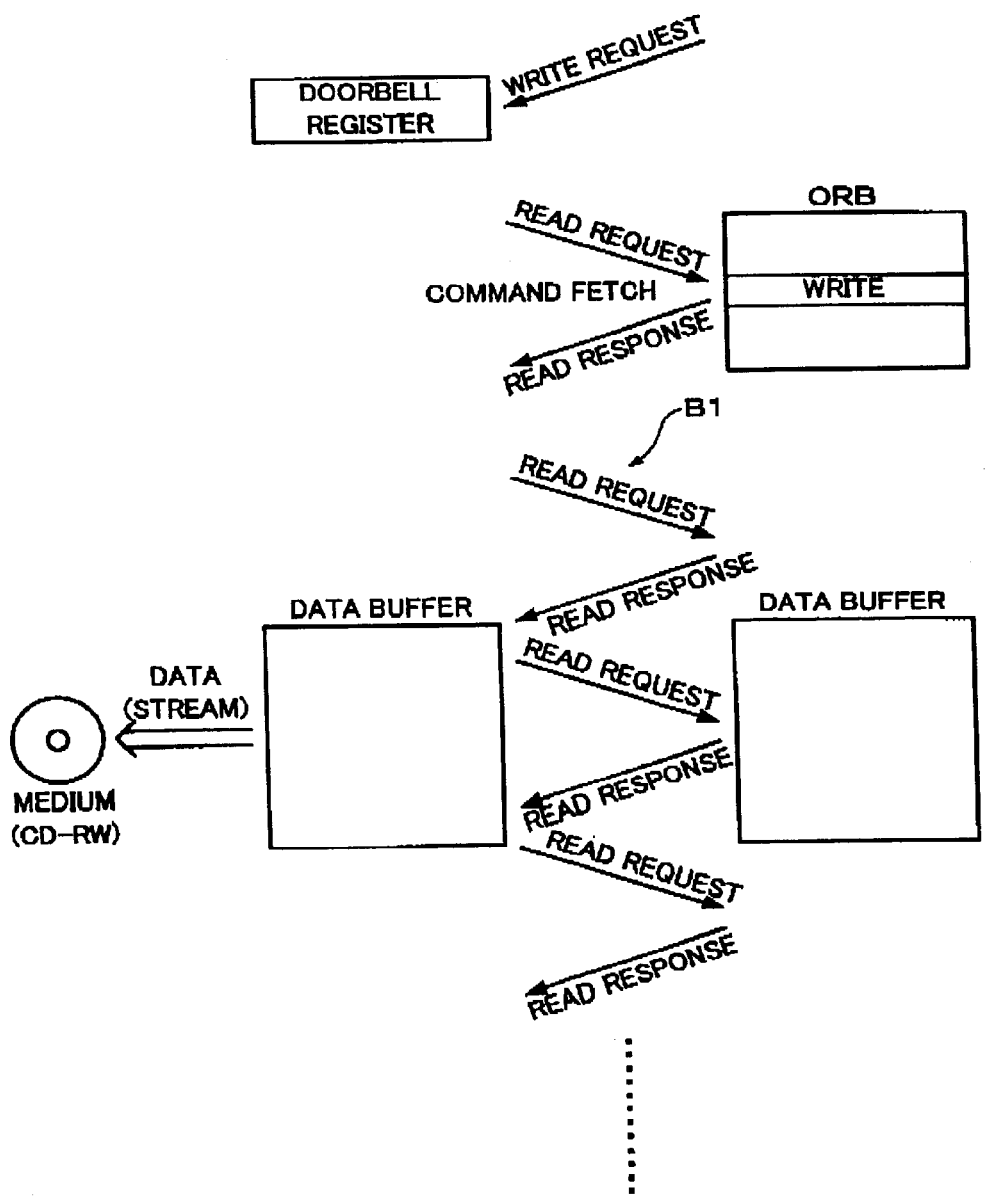
FIG. 5 is illustrative of command processing when data (a data stream) is transferred from an initiator to a target.

If a command comprised within the ORB is a SCSI write command, on the other hand, the target transmits a read request packet to the initiator and the initiator returns the corresponding read response packet, as shown at B1 in FIG. 5. This causes the data (a data stream) that is stored in a data buffer of the initiator to be transmitted to the target, than written to a medium at the target (or printed, if the target is a printer).

With this SBP-2, the target can transmit a request packet (execute a transaction) and send or receive data when its own circumstances allow. Since it is therefore not necessary for the initiator and the target to operate simultaneously, the efficiency of data transfer can be increased.

Note that protocols other than SBP-2 are also being proposed as protocols of a higher order than IEEE 1394, such as the function control protocol (FCP).

Figure 6A:
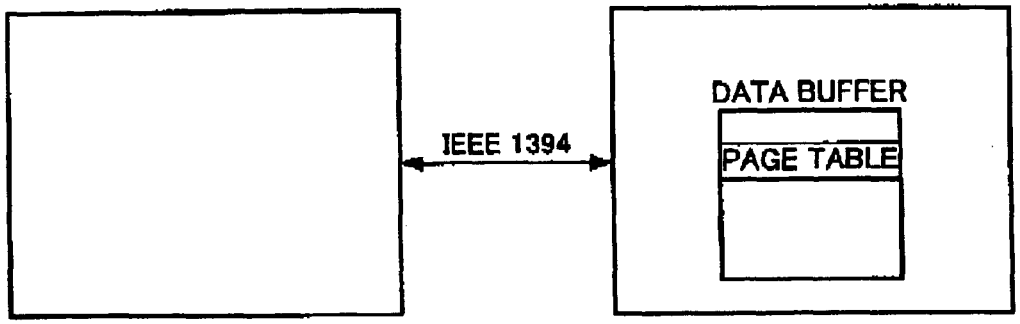
FIGS. 6A, 6B, and 6C are illustrative of page tables.

When data is to be transferred between the target and the initiator, the sequence depends on whether a page table exists in a data buffer (storage means) at the initiator (another node) as shown in FIG. 6A, or whether no such table exists.

Figure 6B:
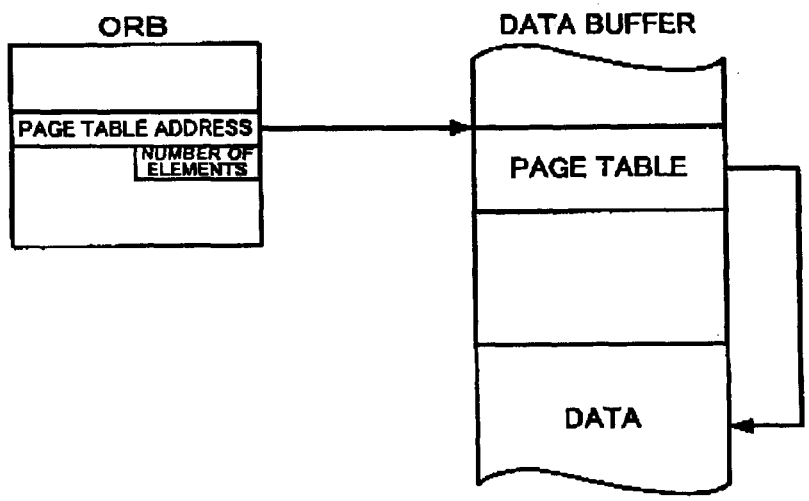

If a page table exists, the address of that page table and the number of elements therein is comprised within the ORB created by the initiator, as shown in FIG. 6B. The address of the transfer data (the read address or write address thereof) is specified as an indirect address using that page table.

Figure 6C:
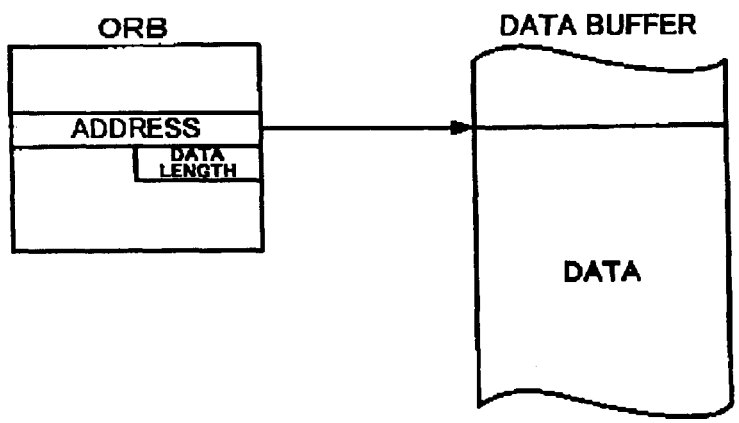

If no such table exists, on the other hand, an address and data length are comprised within the ORB, as shown in FIG. 6C, so that the address of the transfer data is specified as a direct address.

2. Overall Configuration

The overall configuration of this embodiment of the invention is described below, with reference to FIG. 7.

Figure 7:
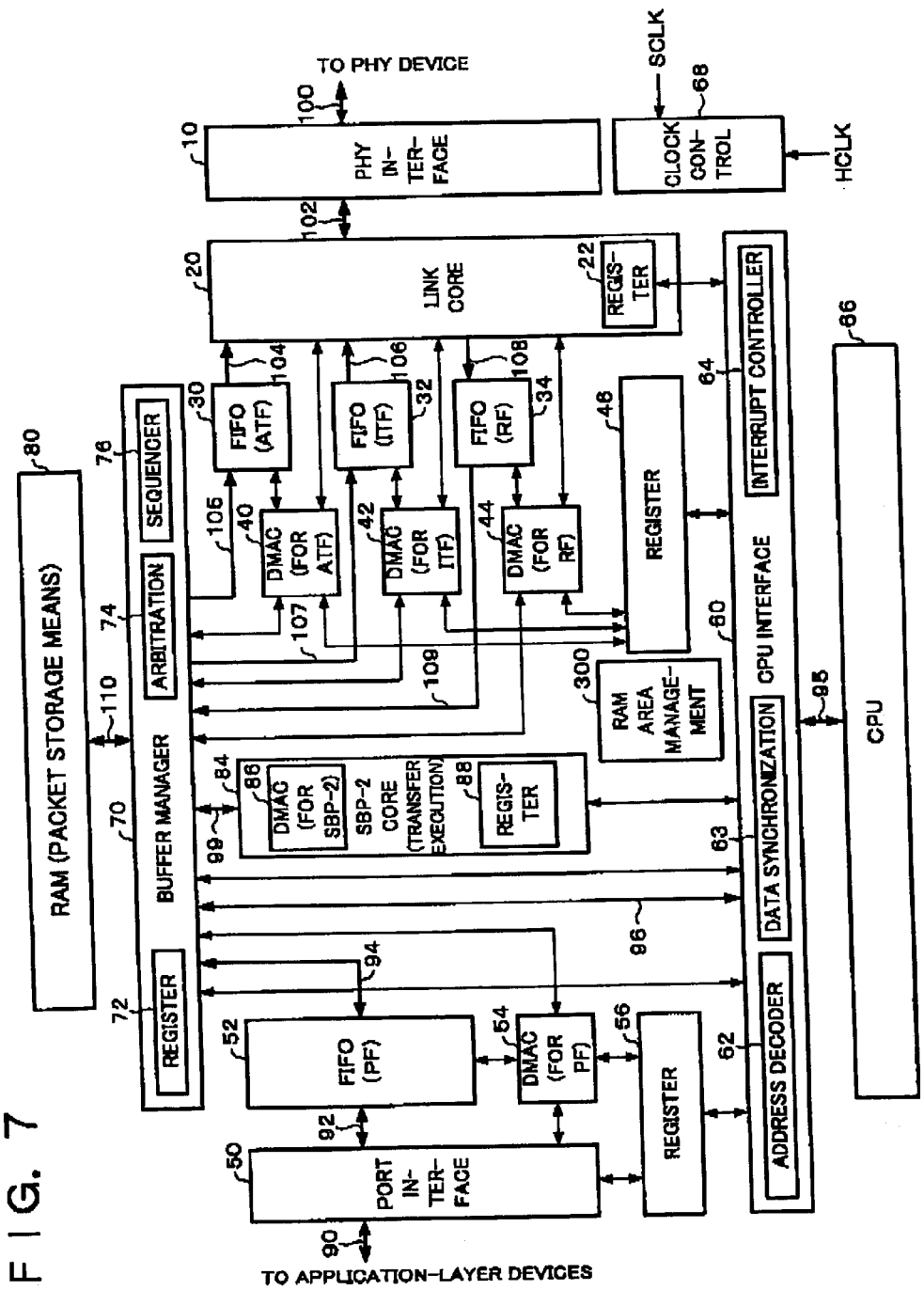
FIG. 7 shows a structural example of a data transfer control device in accordance with an embodiment of this invention.

In FIG. 7, a PHY interface 10 is a circuit that provides an interface with a PHY device (a physical layer device).

A link core 20 (link means) is a circuit implemented in hardware that provides part of the link layer protocol and the transaction layer protocol; it provides various services relating to packet transfer between nodes. A register 22 is provided to control the link core 20.

A FIFO (asynchronous transmission FIFO) 30, a FIFO (isochronous transmission FIFO) 32, and a FIFO (reception FIFO) 34 are FIFOs for asynchronous transmission, isochronous transmission, and reception, respectively; each being configured of hardware means such as registers or semiconductor memory. In this embodiment of the invention, these FIFOs 30, 32, and 34 have an extremely small number of stages. For example, the number of stages per FIFO is preferably no more than three, and more preferably no more than two.

A DMAC 40 (read means), a DMAC 42 (read means), and a DMAC 44 (write means) are DMA controllers for ATF, ITF, and RF, respectively. Use of these DMACS 40, 42, and 44 makes it possible to transfer data between a RAM 80 and the link core 20 without going through a CPU 66. Note that a register 46 provides control such as that over the DMACs 40, 42, and 44.

A port interface 50 is a circuit that provides an interface with application-layer devices (such as printer drivers, by way of example).

A FIFO (PF) 52 is a FIFO used for transferring data to and from an application-layer device and a DMAC 54 is a DMA controller for PF. A register 56 provides control over the port interface 50 and the DMAC 54.

An SBP-2 core 84 (transfer execution circuit) is a circuit that implements part of the SBP-2 protocol and part of the transaction layer as hardware. The functions of this SBP-2 core 84 make it possible to divide transfer data into a series of packets then transfer the thus-divided series of packets continuously. Note that a register 88 is used to provided control over the SBP-2 core 84 and a DMAC (for SBP) 86 is a DHA controller for the SBP-2 core 84.

A RAM area management circuit 300 in a circuit for managing the various areas within the RAM 80. When each of the areas within the RAM 80 becomes full or empty, the RAM area management circuit 300 uses various full or empty signals to control the DMACs 40, 42, 44, 54, and 86.

A CPU interface 60 provides an interface with the CPU 66 (processing means) that controls the data transfer control device. The CPU interface 60 comprises an address decoder 62, a data synchronization circuit 63, and an interrupt controller 64. A clock control circuit 68 controls the clock signals used by this embodiment, and SCLK (the system clock for the data transfer control device) that is sent from the PHY device (PHY chip) and HCLK (the operating clock of the CPU 66) are input thereto.

A buffer manager 70 is a circuit that manages the interface with the RAM 80. The buffer manager 70 comprises a register 72 for controlling the buffer manager, an arbitration circuit 74 that arbitrates the bus connection to the RAM 80, and a sequencer 76 that generates various control signals.

The RAM 80 functions as a randomly accessible packet storage means, where this function is implemented by SRAM, SDRAM, or DRAM or the like.

Note that the RAM 80 is preferably accommodated within the data transfer control device of this embodiment. However, it is possible to attach part or all of the RAM 80 externally.

Figure 8:
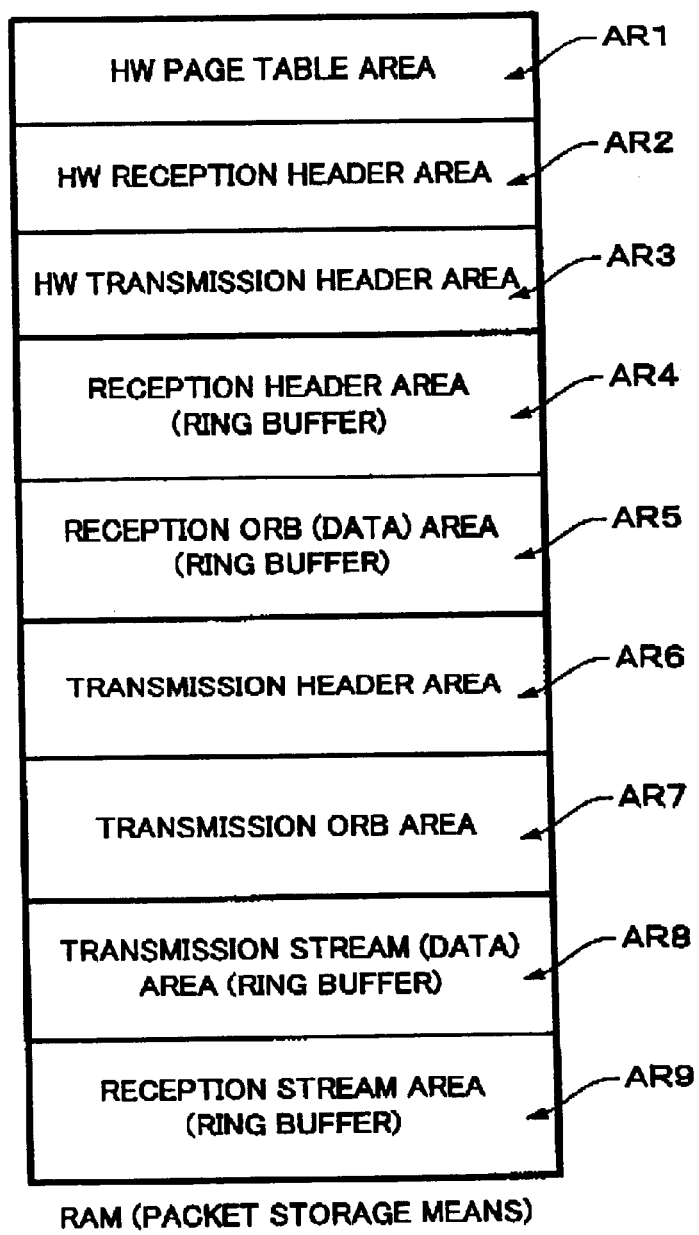
FIG. 8 is illustrative of a technique of separating (dividing) within a RAM (packet storage means).

An example of the memory map of the RAM 80 is shown in FIG. 8. In this embodiment of the invention as shown in FIG. 8, the RAM 80 is divided into header areas (AR2, AR3, AR4, and AR6) and data areas (AR5, AR7, AR8, and AR9). The header of a packet (broadly speaking, control information) is stored in a header area and the data (ORB and stream) is stored in a data area.

In this embodiment of the invention, the data areas (AR5, AR7, AR8, and AR9) in the RAM 80 are divided into ORB areas (AR5 and AR7) and stream areas (AR8 and AR9).

In addition, the RAM 80 in this embodiment is divided into reception areas (AR2, AR4, AR5, and AR9) and transmission areas (AR3, AR6, AR7, and AR8).

Note that each ORB (first data for a first layer) is data (commands) conforming to SBP-2 as described above. A stream (second data for a second layer that is above the first layer) is data for the application layer (such as print data for a printer, read or write data for a CD-RW, or image data that has been fetched by a scanner).

A page table area for hardware (HW), a reception header area for HW, and a transmission header area for HW, denoted by AR1, AR2, and AR3, are areas used by the SBP-2 core 84 of FIG. 7 for writing and reading the page table, reception header, and transmission header.

Note that the areas denoted by AR4, AR5, AR8, and AR9 in FIG. 8 form a structure called a ring buffer.

A bus 90 (or buses 92 and 94) shown in FIG. 7 is for connections to applications (a first bus). Another bus 95 (or bus 96), which is for controlling the data transfer control device or for reading and writing data, is connected electrically to a device (such as a CPU) that controls the data transfer control device as a second bus. Yet another bus 100 (or buses 102, 104, 105, 106, 107, 108, and 109) is for electrical connections to physical-layer devices (such as a PHY device), as a third bus. A further bus 110 (a fourth bus) is for electrical connections to RAM that acts as a randomly accessible storage means. A still further bus 99 (a fifth bus) is for reading and writing header information and page table information, to enable the SBP-2 core 84 to implement SBP-2 by hardware.

The arbitration circuit 74 in the buffer manager 70 arbitrates bus access requests from the DMACs 40, 42, and 44, the CPU interface 60, and the DMACs 86 and 54. Based on the results of this arbitration, a data path is established between one of the buses 105, 107, 109, 96, 99, and 94 and the bus 110 of the RAM 80 (i.e., a data path is established between one of the first, second, third, and fifth buses and the fourth bus).

One feature of this embodiment is the way in which it is provided with the RAM 80, which stores packets in a randomly accessible manner, and also the mutually independent buses 90, 96, 99, and 100 as well as the arbitration circuit 74 for connecting one of those buses to the bus 110 of the RAM 80.

Figure 9:
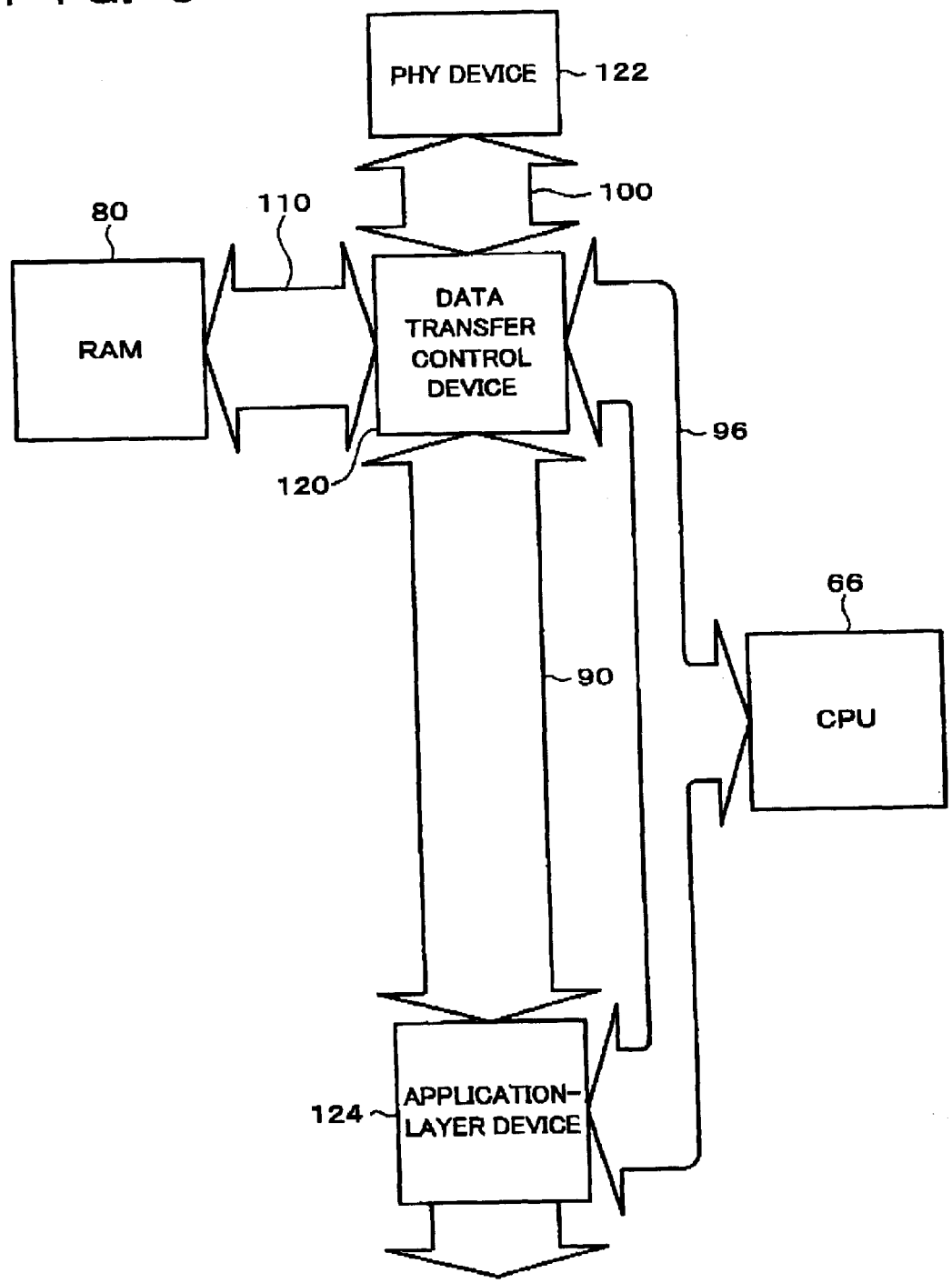
FIG. 9 is illustrative of a data transfer technique in accordance with this embodiment of the invention.

This configuration makes it possible to separate the bus 90 between a data transfer control device 120 and an application-layer device 124; the CPU bus 96; and the bus 110 between the data transfer control device 120 and the RAM 80, as shown in FIG. 9. The CPU bus 96 can therefore be used solely for controlling data transfer. In addition, the bus 90 is dedicated so that it can be used for data transfer between the data transfer control device 120 and the application-layer device 124. If, for example, the electronic equipment in which the data transfer control device 120 is incorporated is a printer, the bus 90 can be used exclusively for transferring print data. As a result, the processing load on the CPU 66 can be reduced and the actual transfer speed of the entire system can be increased. In addition, an inexpensive device can be employed as the CPU 66 and it is also no longer necessary to use a high-speed bus as the CPU bus 96. This ensures that the electronic equipment can be made less expensive and more compact.

3. Configuration of SBP-2 Core (Transfer Execution Circuit)

Figure 10:
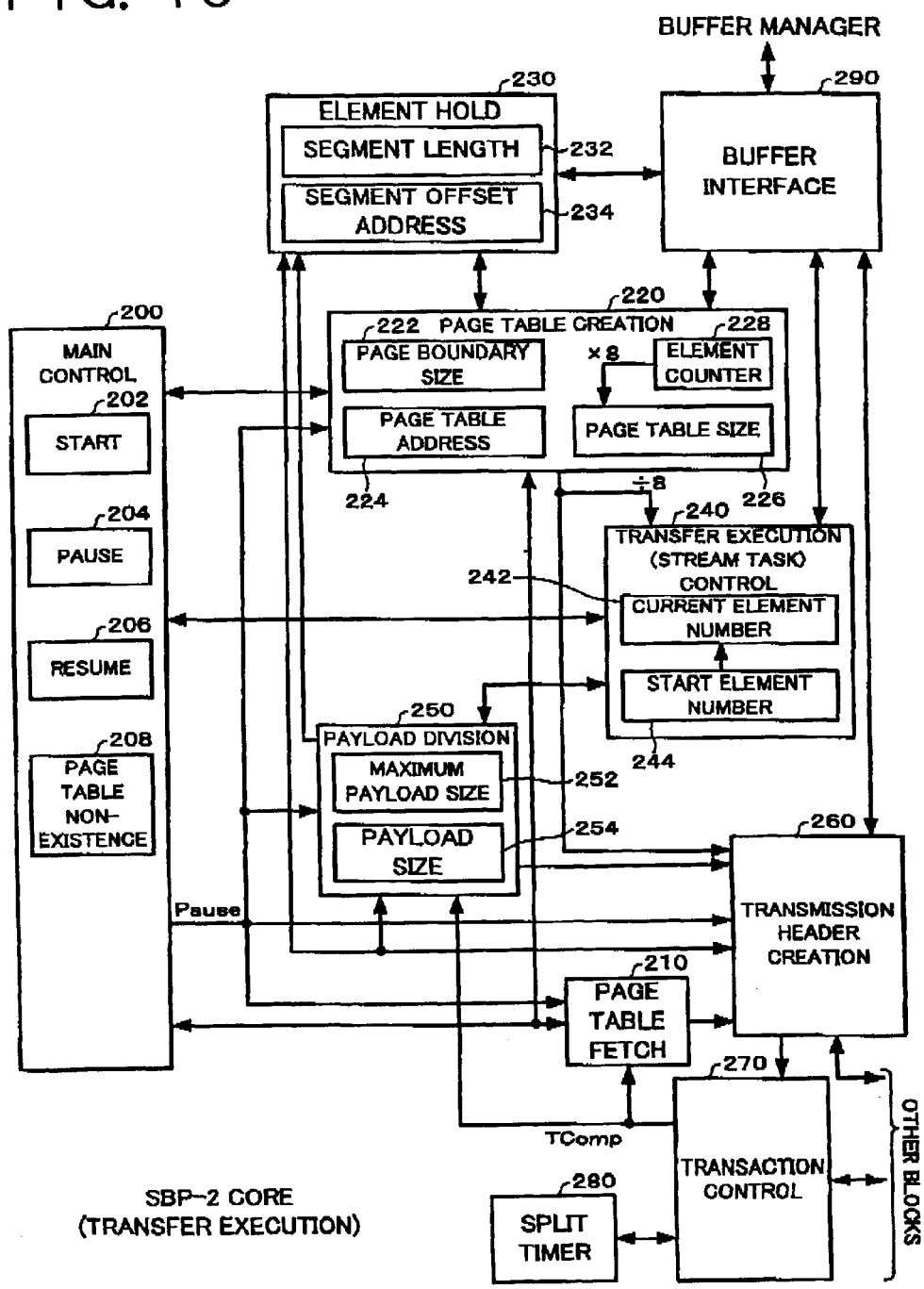
FIG. 10 shows an example of the configuration of the SBP-2 core (transfer execution circuit).

An example of the structure of the SBP-2 core 84 of FIG. 7 is shown in FIG. 10. The SBP-2 core 84 automatically divides transfer data into a series of packets then transfers the series of divided packets continuously. It mainly implements the packet transfer shown at A3 in FIG. 4 and B1 in FIG. 5 by hardware.

A main control circuit 200 is a circuit for providing control over the entire SBP-2 core 84, and it comprises registers 202, 204, 206, and 208.

In this case, the registers 202, 204, and 206 are used by the firmware (CPU) for issuing a start command, pause command, and a resume command, for data transfer (hardware SBP-2 processing). In other words, if the firmware writes 1 to the register 202, this starts processing to divide the transfer data into a series of packets and transfer them continuously. If the firmware writes 1 to the register 204 during this transfer processing, the data transfer is paused; if it writes 1 to the register 206, the paused data transfer starts again.

A register 208 is used for specifying whether or not a page table exists. That is to say, if the firmware has analyzed the ORB from the initiator and has determined that no page table exists in the data buffer of the initiator, 1 is written to the register 208. If the presence of a page table is determined, on the other hand (the case shown in FIG. 6A), 0 is written to the register 208.

If a page table exists in the data buffer (storage means) of the initiator (another node), a page table fetch circuit 210 operates to fetch that page table from the initiator. More specifically, the page table fetch circuit 210 instructs a transmission header creation circuit 260 to fetch the page table then, when the fetch is completed, instructs a page table creation circuit 220 to update the page table address and page table size.

If no page table exists in the data buffer of the initiator, the page table creation circuit 220 operates to create a virtual page table. More specifically, the page table creation circuit 220 creates the page table in accordance with an algorithm described later when the main control circuit 200 instructs the creation of the page table. It then performs processing to write the created page table to the HW page table area in RAM, through an element hold circuit 230 and a buffer interface 290.

Note that the determination of whether or not a page table exists is based on the setting in the register 208, as described above. The page table that has been fetched or created by the page table fetch circuit 210 and/or the page table creation circuit 220 is stored in the HW page table area (AR1 in FIG. 8) in RAM.

The page boundary size specified by the ORB from the initiator is set in a register 222 comprised within the page table creation circuit 220. If a page table exists, the page table address and the page table size (number of elements) specified by the ORB are set in registers 224 and 226 (see FIG. 6B). If no page table exists, on the other hand, the start address and the data length of the transfer data are set (see FIG. 6C). An element counter 228 counts the number of elements (element pointers) of the page table during the creation of the page table.

Note that, if a page table exists and the page table is fetched, the register 226 displays the size of the fetched page table while the firmware is reading it, in byte units (number of elements×8 bytes). If no page table exists and thus the page table has to be created, on the other hand, the register 226 displays the size of the created page table while the firmware is reading it, in byte units (number of elements×8 bytes).

In this embodiment configured as described above, the register 226 displays the page table size in the same byte units, regardless or whether the page table was fetched or created. This makes it possible for other circuit blocks such as a transfer execution control circuit 240 to perform any desired processing that uses the page table size stored in the register 226, regardless of whether the page table was fetched or created. This simplifies the processing and makes the hardware more compact.

The element hold circuit holds information on the page table elements that are objects to be processed by the SHP-2 core, and comprises a register 232 for holding the segment length of the page table elements and a register 234 for holding a segment offset address.

The transfer execution control circuit 240 controls the execution of data transfer (data stream transfer) by the SBP-2 core and comprises registers 242 and 244. The register 242 displays the number of the page table element that is currently being processed. The number of page table elements that starts the data transfer is set by the firmware in the register 244. This makes it possible for the firmware to start the data transfer from any page table element.

Note that the transfer execution control circuit 240 determines whether or not the processing of all the page table elements has been completed by comparing the number of elements obtained by dividing the page table size in the register 226 by 8 and the current element number in the register 242. If, for example, a page table of 24 pages has been fetched, processing end when the current element number reaches 24. Similarly, if a page table of three pages has been fetched, processing end when the current element number reaches 3.

A payload division circuit 250 performs processing to divide the transfer data into packets of the payload size. The maximum payload size, specified by an ORB, is set in a register 252 comprised within the payload division circuit 250. Another register 254 displays the actual payload size. The payload division circuit 250 performs the payload division processing, based on the segment length of page table elements that is read out from the HW page table area (AR1 of FIG. 8) and held in the register 232 and the maximum payload size that is set in the register 252.

The transmission header creation circuit 260 creates the header of each request packet shown in A3 of FIG. 4 or B1 of FIG. 5, based on details such as a speed code and a destination ID that have been set by the firmware. The thus created header is stored in the HW transmission header area in the RAM (AR3 in FIG. 8). In this manner, this embodiment of the invention can greatly reduce the processing load on the firmware, because the automatic creation of headers of a series of request packet that is to be transferred continuously is done by the hardware.

A transaction control circuit 270 receives error information and status information from external circuit blocks such as the link core and performs processing for executing a transaction. On completion of the execution of the transaction, a transaction completion TComp signal goes active to inform the page table fetch circuit 210 and the payload division circuit 250. The SBP-2 core of this embodiment of the invention manages data transfers in transaction units, not packet units.

A split timer 280 loads a split time value when a transaction starts, then starts a count-down. When this count reaches zero, the fact that time-out has occurred is transmitted to the transaction control circuit 270.

The buffer interface 290 functions as an interface with the buffer manager 70 of rig. 7. The configuration is such that each block of the SBP-2 core 84 requests access to the RAM 80 with respect to the buffer manager 70, through the buffer interface 290.

3.1 Main Control Circuit

Figure 11:
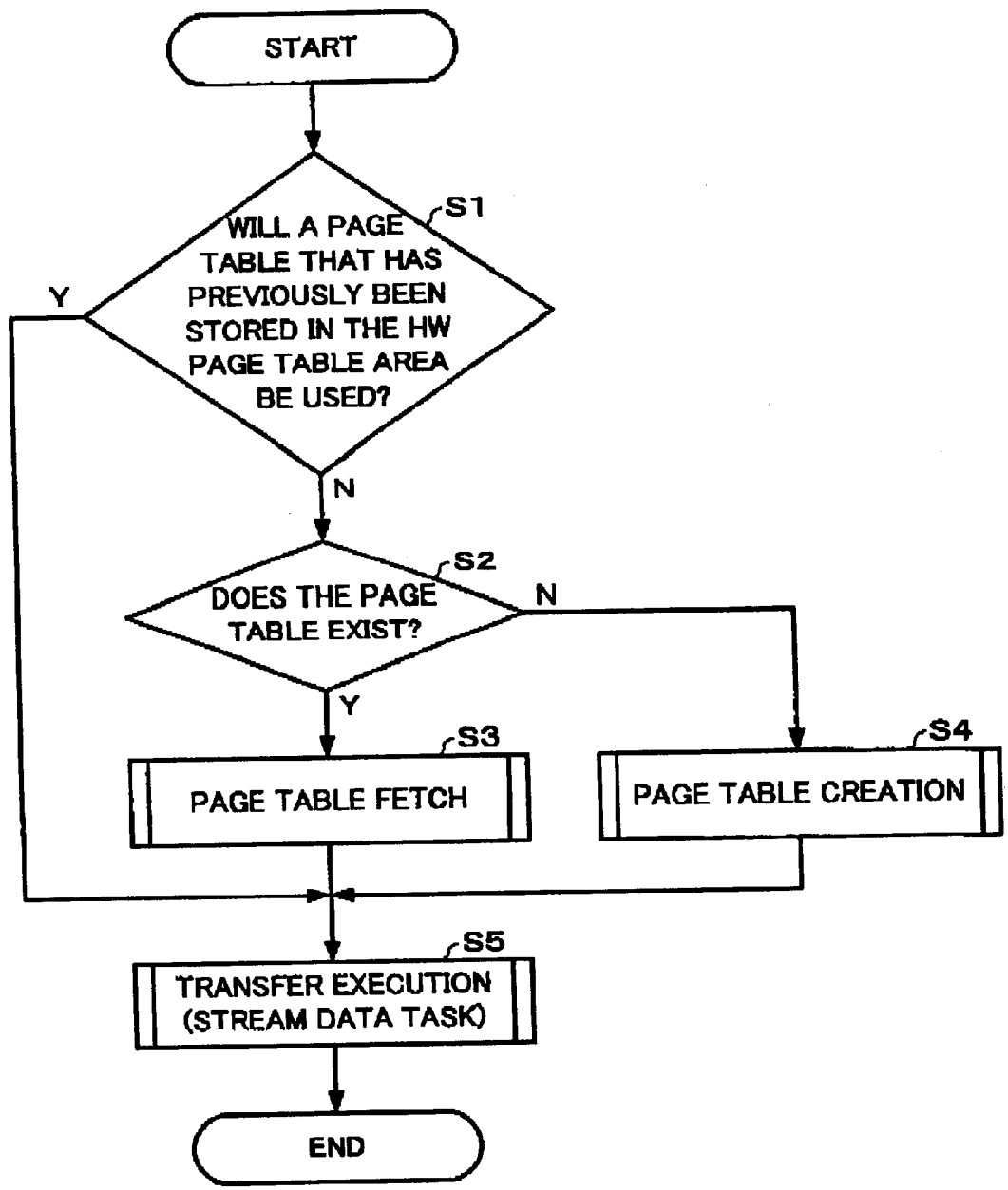
FIG. 11 is a flowchart illustrating the operation of the main control circuit.

The operation of the main control circuit 20 will now be described with reference to the flowchart of FIG. 11.

First of all, the main control circuit 200 determines whether or not a page table that has been previously stored in the HW page table area is to be used (step S1), then the flow proceeds to step S5 if it is to be used or to step S2 if it is not going to be used. The setting that determines whether or not a page table that has been previously stored in the HW page table area is to be used is implemented by the firmware writing a given setting to a given register.

The main control circuit 20 then determines whether or not a page table exists in the data buffer of the initiator, based on the setting of the register 208 of FIG. 10 (step S2). If a page table exists, the main control circuit 20 instructs the page table fetch circuit 210 to start the fetch of the page table (step S3). If no page table exists, on the other hand, it instructs the page table creation circuit 220 to start the creation of a page table (step S4).

When the processing for fetching or creating the page table has ended, the main control circuit 20 instructs the transfer execution control circuit 240 to start the transfer execution processing (stream data task) (step S5).

3.2 Page Table Fetch Circuit

Figure 12:
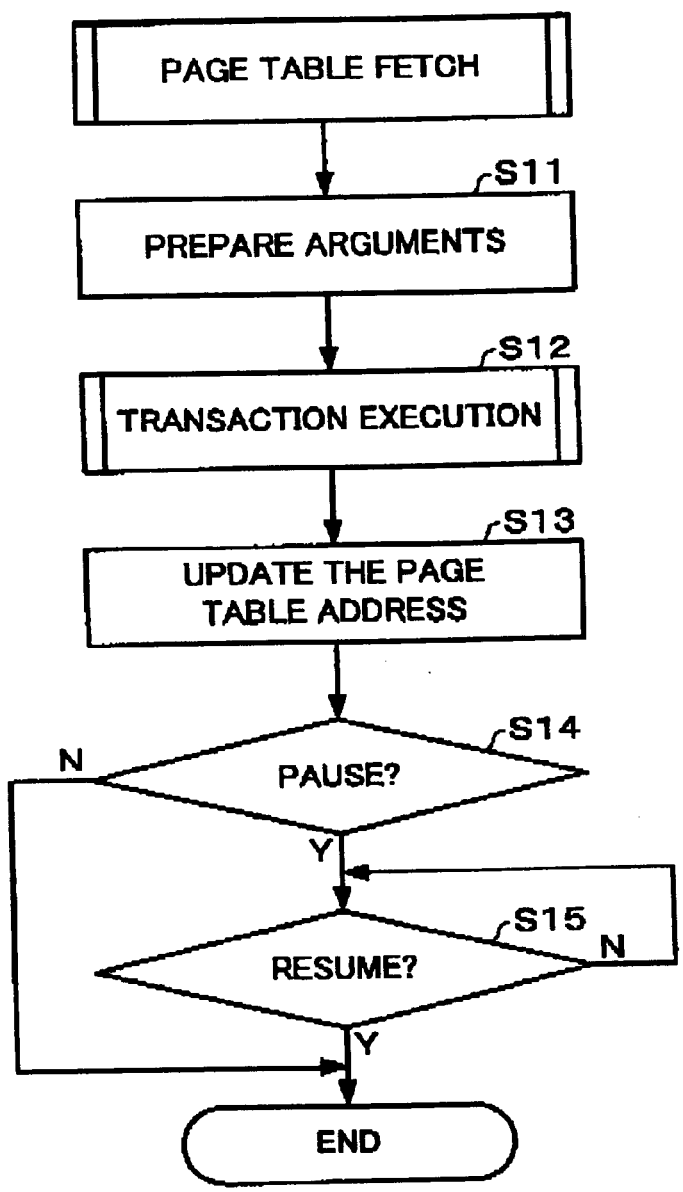
FIG. 12 is a flowchart illustrating the operation of the page table fetch circuit.

The operation of the page table fetch circuit 210 will now be described with reference to the flowchart of FIG. 12.

The arguments that are necessary for fetching the page table, such as the page table address and the page table size (number of elements), are first prepared (step S11). The page table fetch circuit 210 instructs the transmission header creation circuit 260 to start the transaction execution (step S12). When the completion of the transaction is notified by the TComp signal, it instructs the page table creation circuit 220 to update the page table address (step S13).

The page table fetch circuit 210 then determines whether or not a pause has been instructed, based on a Pause signal from the main control circuit 200 (step S14). In other words, if the firmware issues a pause command by writing 1 to the register 204, the pause signal goes active and a pause is instructed. If the firmware issues a resume command and writes 1 to the register 206, the pause is canceled and data transfer is resumed (step S15).

3.3 Page Table Creation Circuit

If no page table exists in the data buffer of the initiator, the page table creation circuit 220 operates to create a virtual page table and the thus created page table is stored in the HW page table area in RAM. The configuration is such that, if no page table exists in the data buffer of the initiator, the transfer data is divided into packets that do not traverse page boundaries, based on the thus created virtual page table, then is transmitted.

Figure 13:
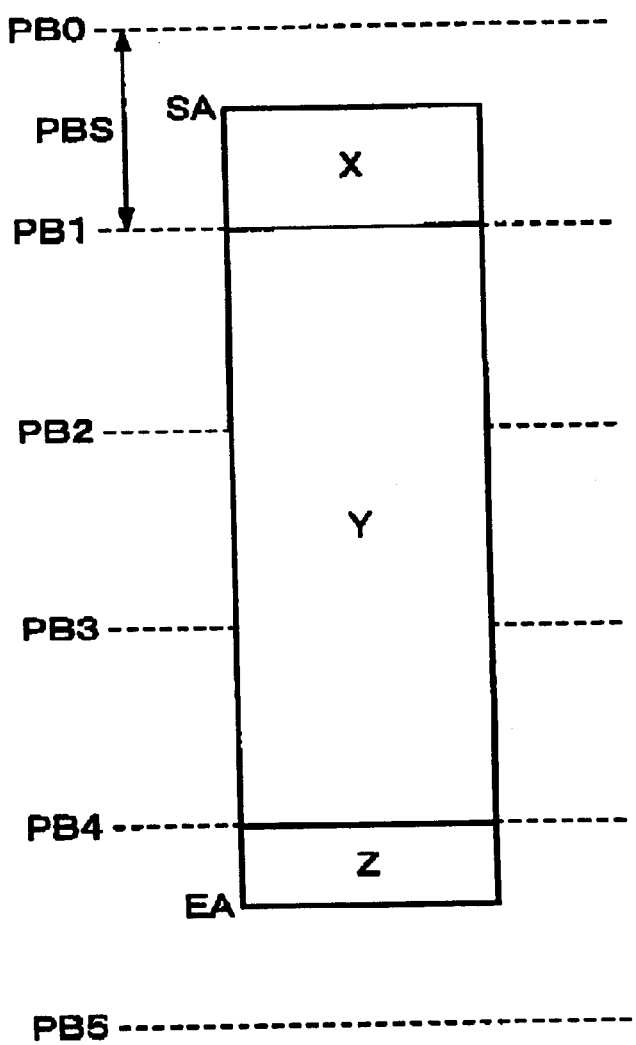
FIG. 13 is illustrative of the technique of creating a page table in accordance with this embodiment of the invention.

Assume, by way of example, that a start address SA of transfer data is between page boundaries PB0 and PB1 and an end address EA thereof is between page boundaries PB4 and PB5, as shown in FIG. 13. In this case, the page table creation circuit 220 of this embodiment of the invention creates a virtual page table in which the number of elements of the page table between the page boundary PB1 and PB4 (the Kth and Lth page boundaries) is one (broadly speaking, a predetermined number).

More specifically, it creates a three-page page table wherein a portion between the start address and the page boundary PB1 becomes an X-type page table element (a first page table element), a portion between the page boundaries PB1 and PB4 becomes a Y-type page table element (a second page table element), and a portion between the page boundary PB4 and the end address becomes a Z-type page table element (a third page table element).

Figure 14:
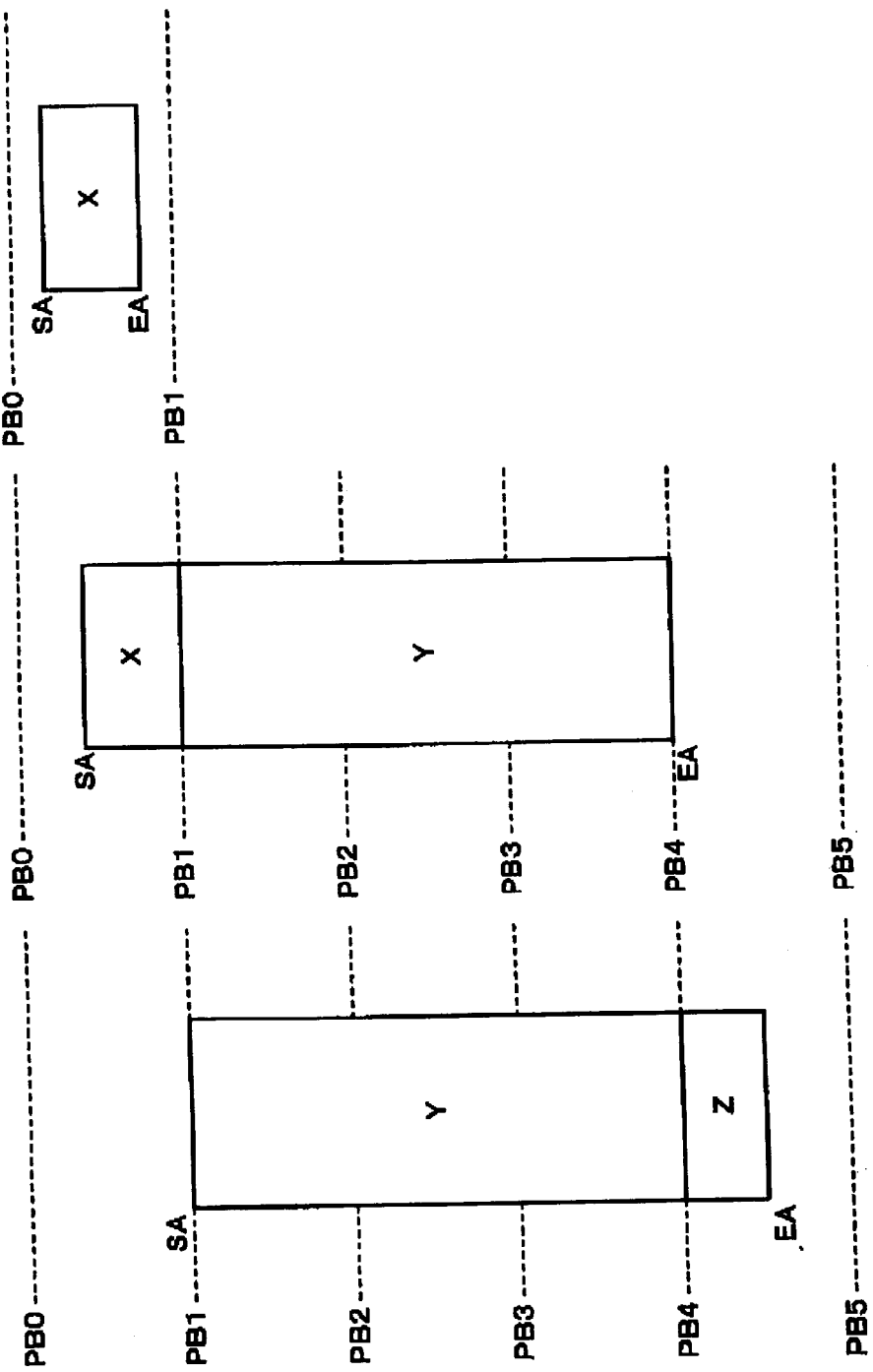
FIGS. 14A, 14B, and 14C are also illustrative of the technique of creating a page table in accordance with this embodiment of the invention.

It should be noted, however, that if the start address SA of the transfer data lies on the page boundary PB1 (the Kth page boundary), as shown in FIG. 14A, the X-type page table element is not created and thus a two-page page table is formed. Similarly, if the end address of the transfer data lies on the page boundary PB4 (the Lth page boundary), as shown in FIG. 14B, the Z-type page table element is not created and thus a two-page page table is formed. Furthermore, if the start address SA of the transfer data lies between the page boundaries PB0 and PB1 and the end address EA thereof lies between the page boundaries PB0 and PB1 or on the page boundary PB1, a one-page page table is created having just the X-type page table element between SA and EA.

In this embodiment of the invention, the payload division circuit 250 of FIG. 10 divides the transfer data into packets of the payload size the maximum payload size of which is the divisor of the page boundary size. In other words, the data is divided into packets such that the maximum payload size MaxPLS is the divisor of the page boundary size PBS, as shown in FIG. 15.

Figure 15:
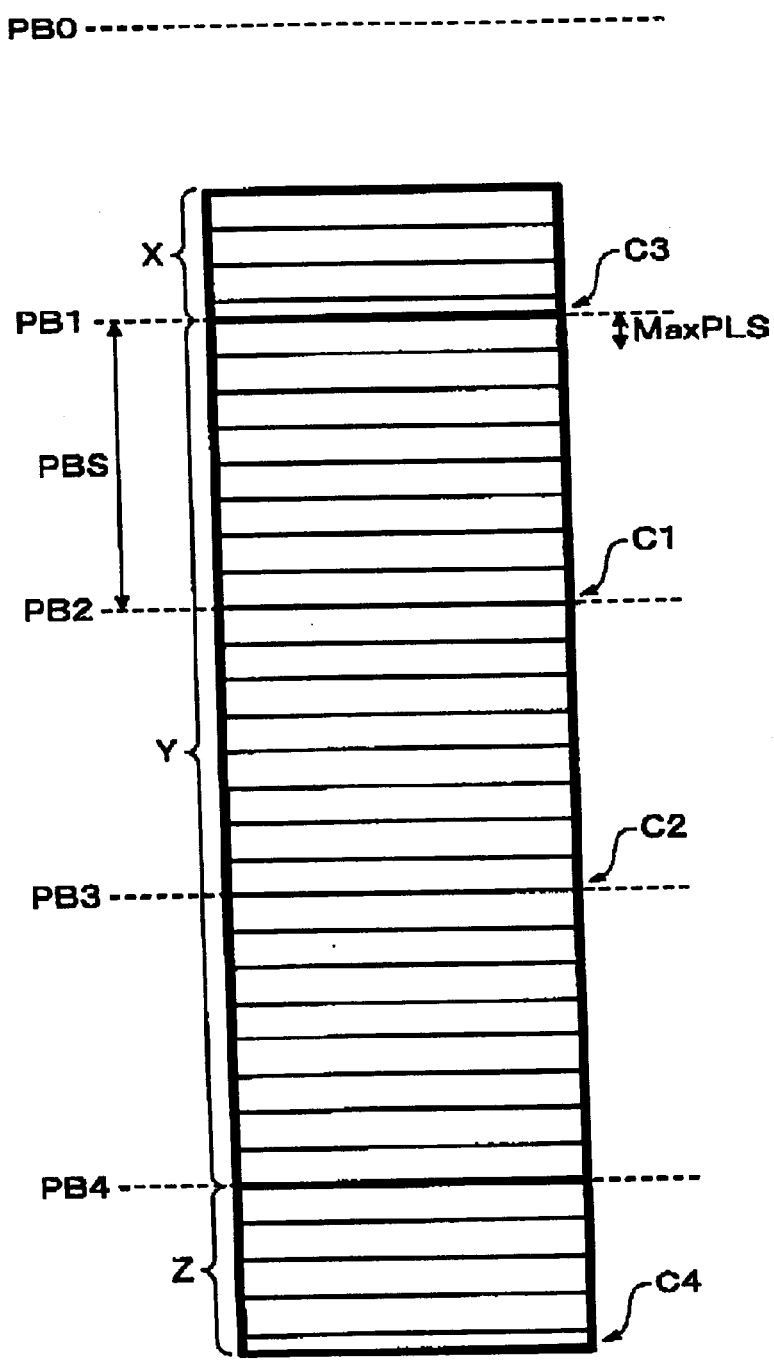
FIG. 15 is illustrative of the payload division technique in accordance with this embodiment of the invention.

If the maximum payload size MaxPLS is set to the divisor of the page boundary size PBS in this manner, this ensures that the payload of each packet does not traverse a page boundary, as shown at C1 and C2 in FIG. 15, by way of example. This ensures that data transfer can be done while observing the restriction on traversing page boundaries, even if a page table is created such that the number of page table elements between the page boundaries PB1 and PB4 is one, as shown in this embodiment of the invention.

Figure 16:
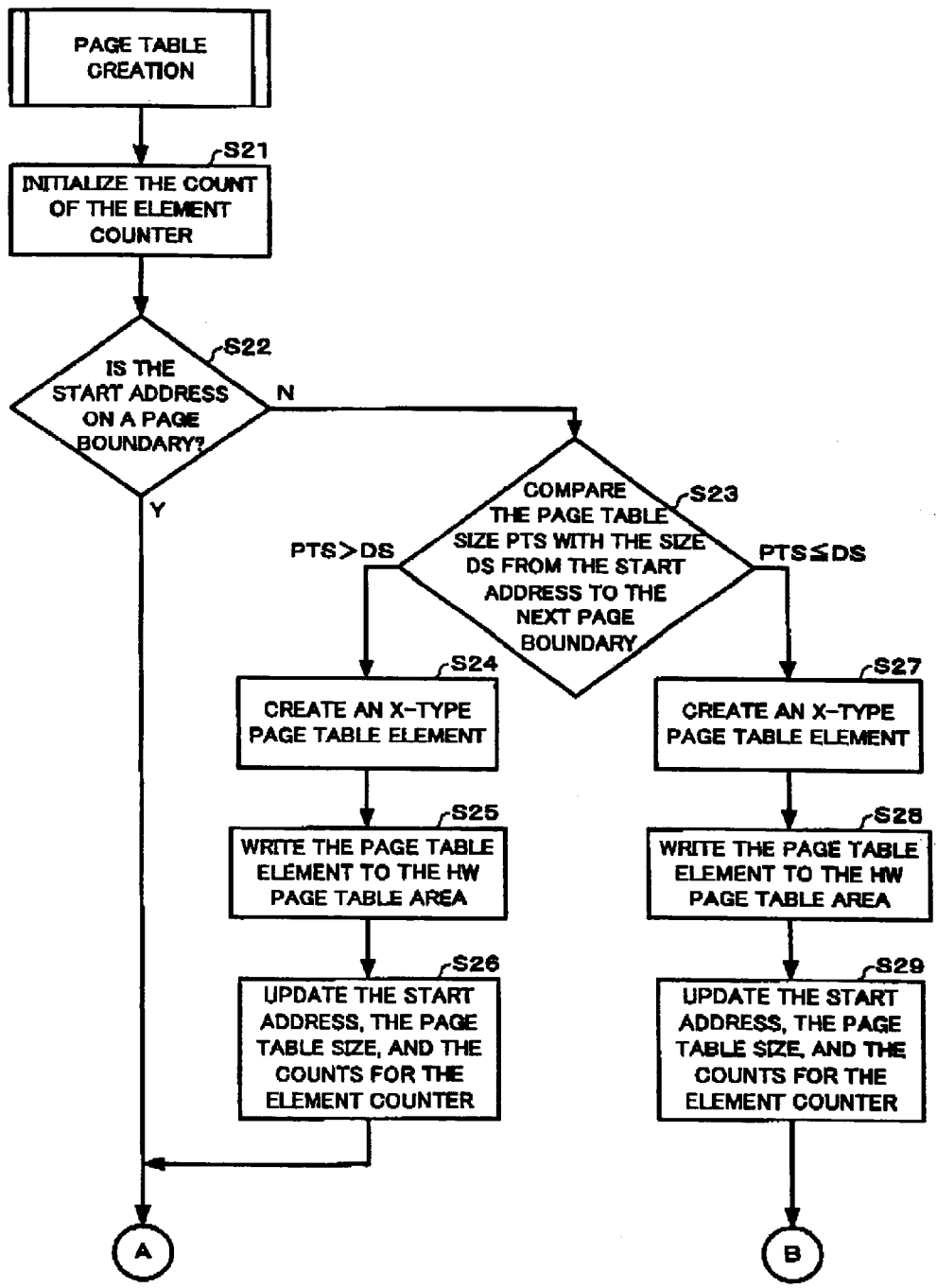
FIG. 16 is a flowchart illustrating the operation of the page table creation circuit.

The operation of the page table creation circuit 220 will now be described with reference to the flowcharts of FIGS. 16 and 17.

First of all, the count (element pointer) of the element counter 228 of FIG. 10 is initialized (step S21). In this embodiment of the invention, the count range of the element counter 228 is 0 to 2, so the count is returned to 0 by the initialization.

The page table creation circuit 220 then determines whether or not the start address lies on a page boundary (step S22). More specifically, it determines whether or not there are zeros in the low-order bits 0 to M (where M is a value determined by the page boundary size) of the start address of the transfer data specified as a direct address by the ORB (see FIG. 6C). If all of the low-order bits 0 to M are zero, the page table creation circuit 220 determines that the start address lies on a page boundary and the flow proceeds to step S30 in FIG. 17. If one of the low-order bits 0 to M is not zero, on the other hand, it determines that the start address does not lie on a page boundary and the flow proceeds to step S23.

If the start address does not lie on a page boundary and thus the flow has branched to step S23, the page table size PTS is compared with the size DS from the start address to the next page boundary. If the page table size PTS is greater than the size DS from the start address SA to the next page boundary PB1, as shown by way of example in FIG. 18A or 18B, the flow proceeds to step S24 to create an X-type page table element. This page table element is written to the HW page table area in RAM (AR1 of FIG. 8) (step S25). More specifically, the size DS from the start address SA to the page boundary PB1 is written to the segment length register 232 of FIG. 10 and the start address SA is written to the segment offset address register 234. The buffer interface 290 is instructed to write the values in these registers 232 and 234 into the HW page table area in RAM.

The start address SA, the page table size PTS, and the counts for the element counter 228 are then updated (step S26). In other words, the start address SA is updated to an address SA' that lies on the page boundary PB1 (SA'=SA+DS) and the page table size PTS is updated to a size PTS' that is the length between the page boundary PB1 and the end address EA (PTS'=PTS−DS), as shown in FIG. 18D or 18E. The count in the element counter 228 is incremented by one. Then, the flow proceeds to step S30 in FIG. 17 which is the proceeding destination when the start address lies on a page boundary.

With this embodiment of the invention as described above, if the start address SA is between the page boundaries PB0 and PB1, and the end address EA is beyond PB1 as shown in FIGS. 18A and 18B, the portion between SA and PB1 is made an X-type page table element, then subsequent page table elements are processed assuming that the start address SA lies on PB1. This means that, the processing from step S30 onward is in common, regardless of whether the start address SA does or does not lie on the page boundary PB1. This simplifies the processing and makes the circuitry sore compact.

If PTS is determined to be less than or equal to DS in step S23 and the flow proceeds to step S27, the X-type page table element is created as shown in FIG. 18C. Write processing of the created page table element (the segment length and segment offset address thereof) and updating of the start address SA, the page table size PTS, and the count of the element counter 228 are then done (steps S28 and S29). In this case, only a one-page X-type page table element is created, as shown in FIG. 18C, and the flow proceeds to step S38 of FIG. 17.

Figure 17:
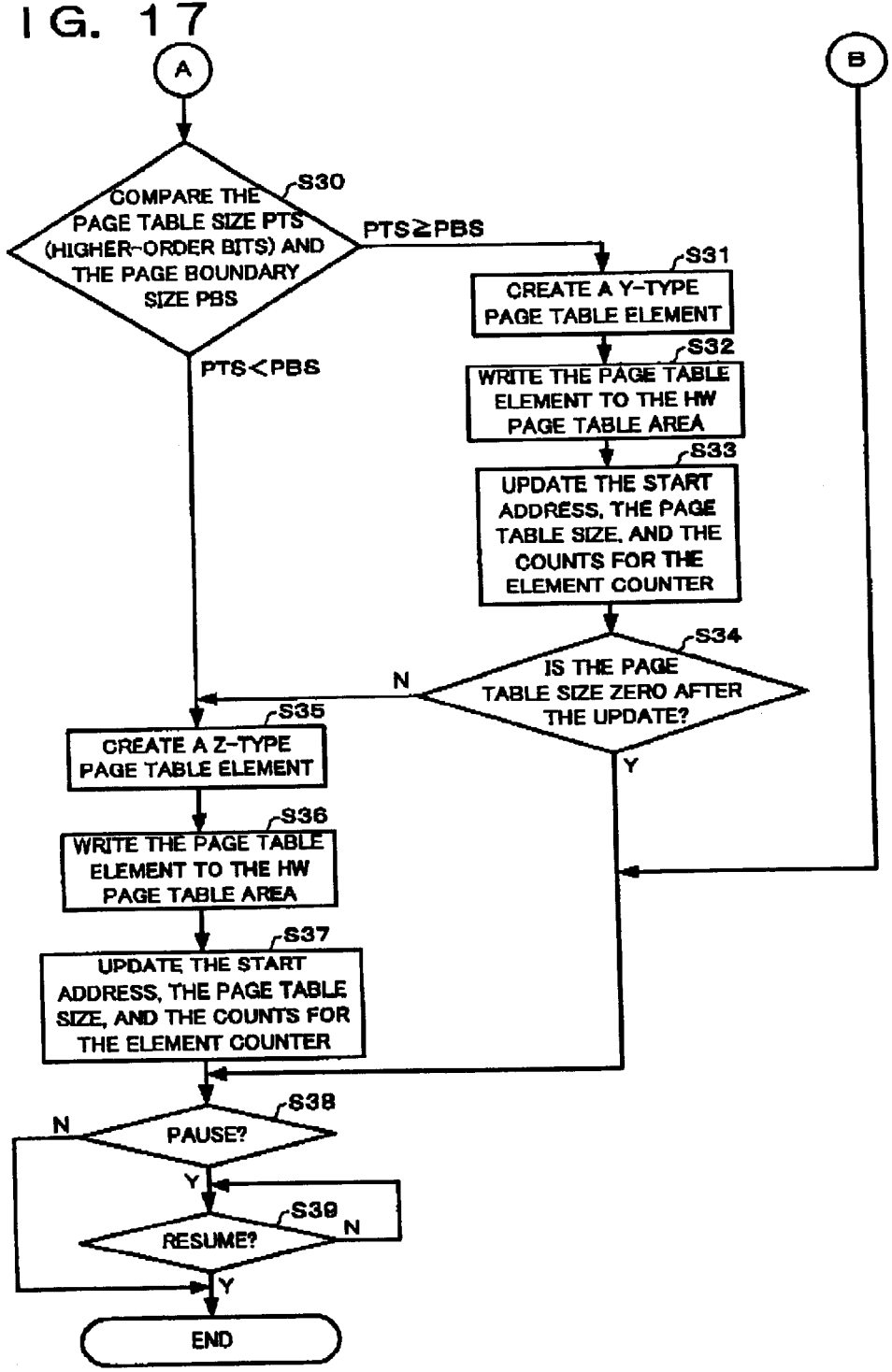
FIG. 17 is a further flowchart illustrating the operation of the page table creation circuit.

If the flow has branched to step S30 of FIG. 17, the page table size PTS (the higher-order bits M+1 to N) and the page boundary size PBS are compared. If PTS is less than PBS, as shown in FIG. 19A, the flow proceeds to step S35. If PTS is greater than or equal to PBS, on the other hand, the flow proceeds to step S31.

If the flow has proceeded to step S31, a Y-type page table element is created as shown in FIGS. 19B, 19C, and 19D. This page table element is written to the HW page table area in RAM (step S32). More specifically, the higher-order bits M+1 to N of the page table size PTS are written to the segment length register 232 of FIG. 10 and the start address SA is written to the segment offset address register 234. The buffer interface 290 is instructed to write the values in these registers 232 and 234 into the FrW page table area in RAM.

Note that the higher-order bits M+1 to N of the page table size PTS that are written as the segment length are equivalent to the size between SA and PB2 in FIG. 19B or the size between SA and PB3 in FIGS. 19C and 19D.

Figure 20A:
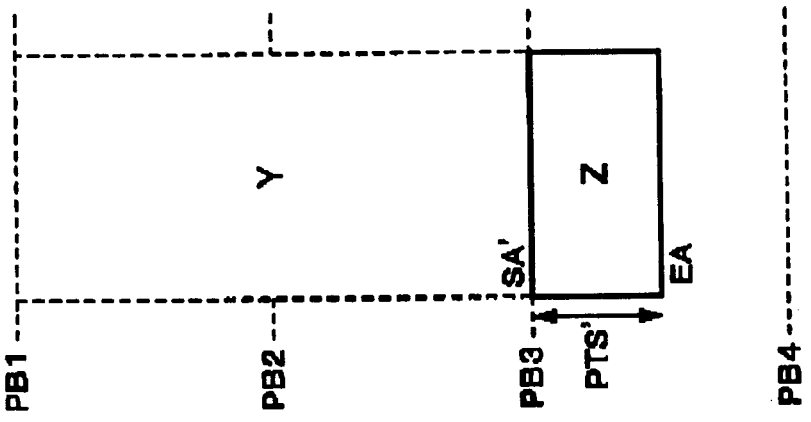
FIGS. 20A and 20B also illustrate techniques for creating page table elements.
Figure 20B:
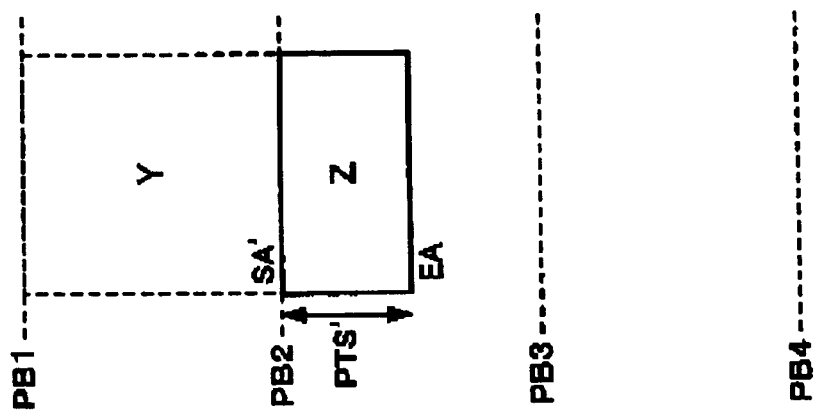

The start address SA, the page table size PTS, and the counts for the element counter 228 are then updated (step S33). In other words, in the situation shown in FIG. 19B, SA is updated to an address SA' on PB2 and PTS is updated to the size PTS' between PB2 and EA, as shown in FIG. 20A. In the situation shown in FIG. 19D, SA is updated to an address SA' on PB3 and PTS is updated to the size PTS' between PB3 and EA, as shown in FIG. 20B. The count of the element counter 228 is incremented to 2.

The page table creation circuit 220 then determines whether or not the page table size has become zero after the update (step S34). In the situations shown in FIGS. 19B and 19D, the page table size PTS' after the update is not zero, as shown in FIGS. 20A and 20B, so the flow proceeds to step S35. If the page table size PTS' after the update is zero, as shown in FIG. 19C, the flow proceeds to step S38.

If the flow has branched to step S35, a Z-type page table element is created as shown in FIGS. 20A and 20B. Write processing of the created page table element and updating of the start address SA, the page table size PTS, and the count of the element counter 228 are then done (steps S36 and S37).

The page table creation circuit 220 then determines whether or not to pause the processing, based on the Pause signal from the main control circuit 200 (step S38.) If the processing has been paused, it determines whether or not to resume the processing, also based on this Pause signal (step S39). In other words, processing is paused if Pause is active and processing resumes if Pause is inactive.

3.4 Transfer Execution (Stream Task) Control Circuit

Figure 21:
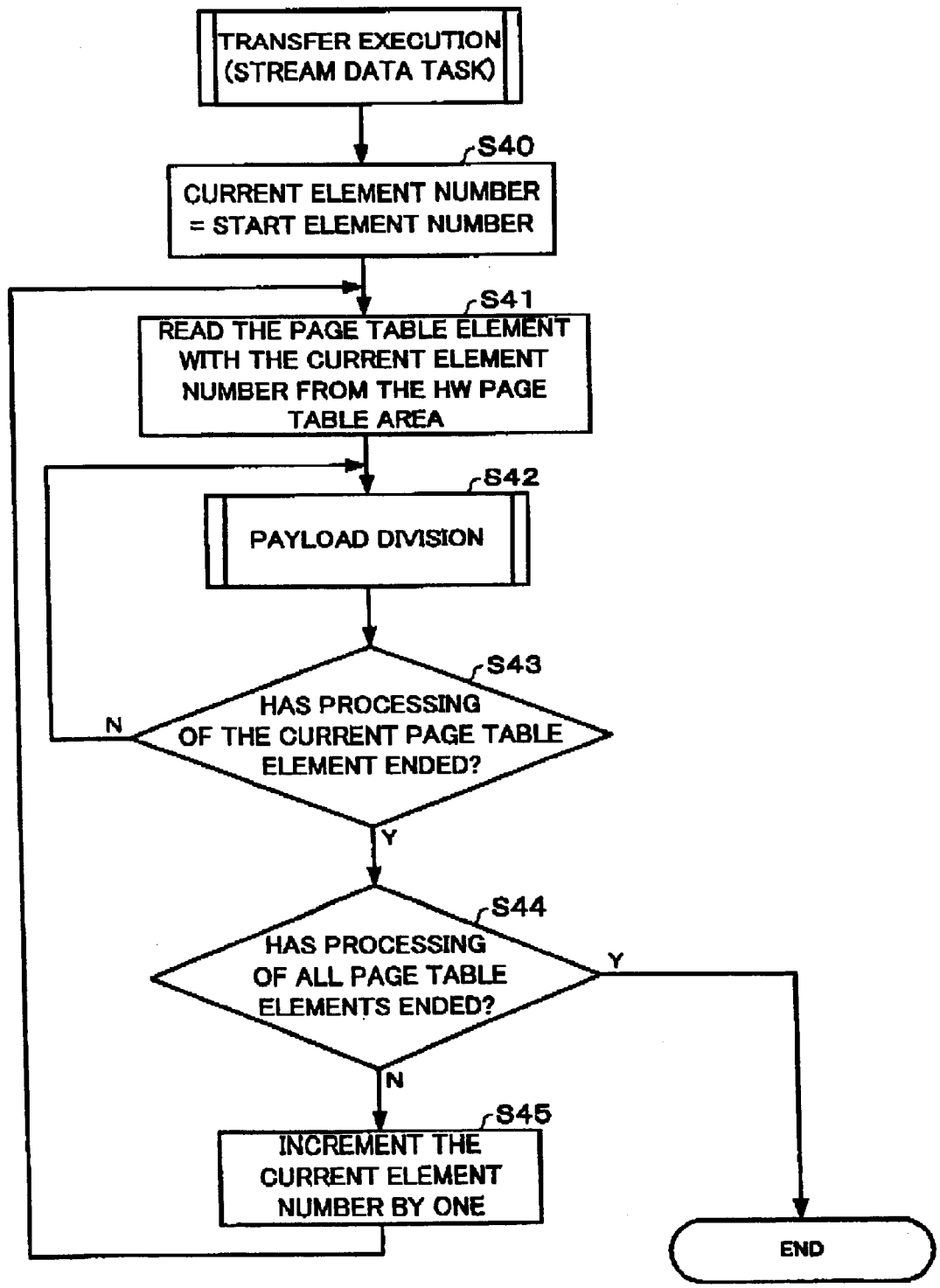
FIG. 21 is a flowchart illustrating the operation of the transfer execution control circuit.

The operation of the transfer execution control circuit 240 will now be described with reference to the flowchart of FIG. 21.

First of all, the current element number is loaded into the register 242 in FIG. 10 and the start element number is loaded into the register 244 (step S40). The page table element with the current element number is read out from the HW page table area in RAM (step S41). More specifically, the transfer execution control circuit 240 instructs the buffer interface 290 to read out the page table element that is to be processed. When this happens, the buffer interface 290 reads the page table element that is to be processed from the HW page table area in RAM, then writes the segment length of the page table element to the register 232 and the segment offset address to the a register 234.

The transfer execution control circuit 240 instructs the payload division circuit 250 to start the payload division processing (step S42).

The transfer execution control circuit 240 then determines whether the processing of the current page table element has ended (step S43) and, if it has not ended, the flow returns to step S42. If the processing has ended, on the other hand, it determines whether or not the processing of all of the page table elements has ended (step S44) and, if it has not ended, the current element number is incremented by one (step S45) then the flow returns to step S41.

Note that the determination of whether or not the processing of all of the page table elements has ended is done by comparing the number of elements obtained by dividing the page table size stored in the register 226 by 8 with the current element number.

3.5 Payload Division Circuit

Figure 22:
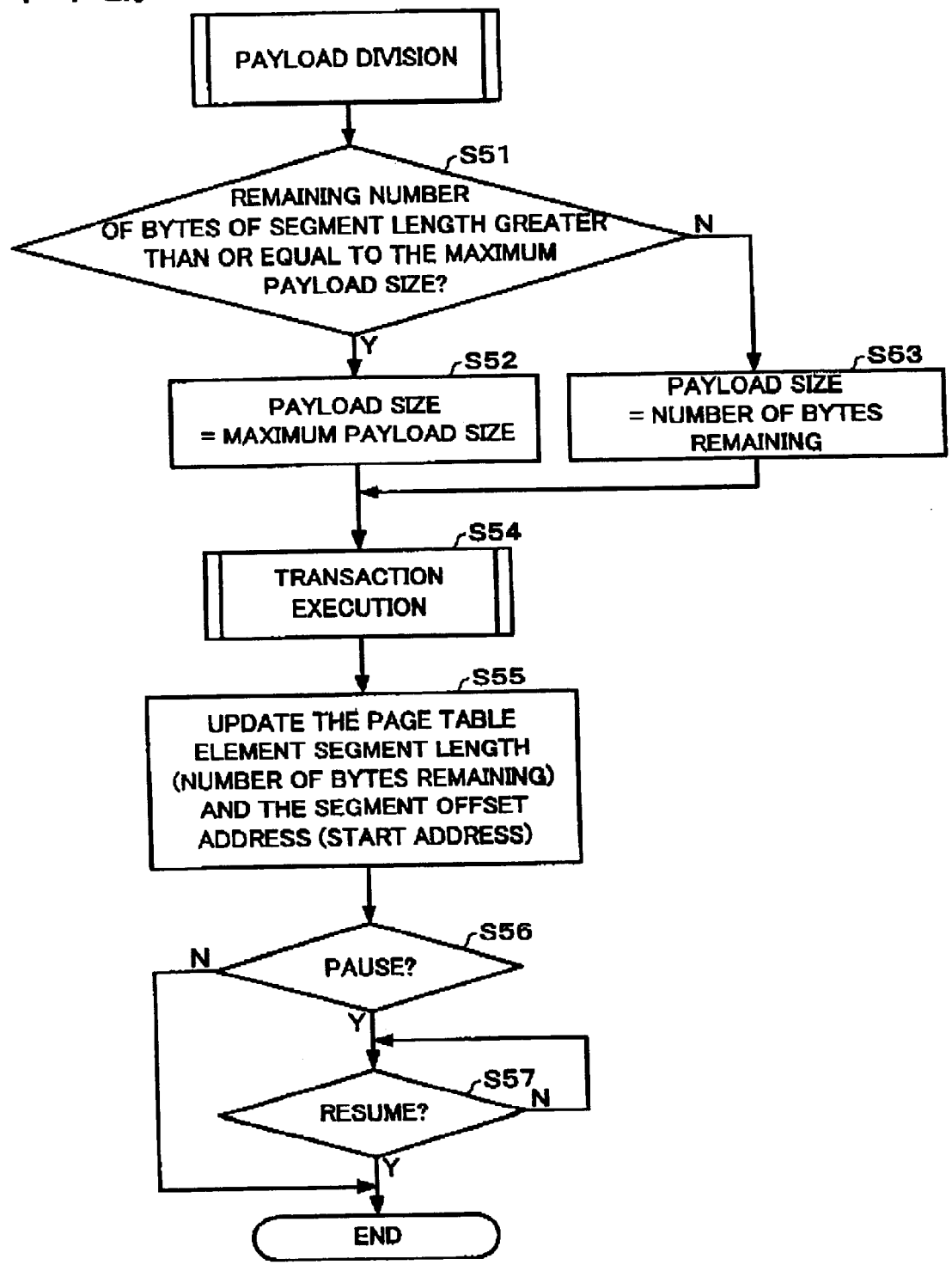
FIG. 22 is a flowchart illustrating the operation of the payload division circuit.

The description now turns to the operation of the payload division circuit 250, with reference to the flowchart of FIG. 22. The payload division circuit 250 operates to divide the transfer data into packets of the payload size, as shown in FIG. 15.

First of all, the payload division circuit 250 determines whether or not the number of bytes remaining of the segment length of the page table element that is stored in the register 232 of FIG. 10 is greater than or equal to the maximum payload size (step S51). If the number of bytes remaining is greater than or equal to the maximum payload size, the payload size of packets is set to the maximum payload size (step S52). If the number of bytes remaining is less than the maximum payload size, as shown at C3 or C4 in FIG. 15, the payload size of packets is set to the number of bytes remaining (step S53).

Note that the maximum payload size MaxPLS is set to the divisor of the page boundary size PBS in this embodiment of the invention, as described with reference to FIG. 15. This ensures that the packet payload does not traverse the page boundaries PB2 and PB3, as shown at C1 and C2 in FIG. 15, even if the transfer data of an Y-type page table element has been divided into packets of the maximum payload size MaxPLS by the processing shown in FIG. 22.

After the payload size has been set, the transmission header creation circuit 260 is instructed to start the transaction execution processing (create a transmission header) (step S54). If transaction completion is posted by the TComp signal from the transaction control circuit 270, the element hold circuit 230 is instructed to update the segment length (number of bytes remaining) and the segment offset address (start address) of the page table elements that are stored in the registers 232 and 234 (step S55).

The payload division circuit 250 then determines whether or not to pause the processing, based on the Pause signal from the main control circuit 200 (step S56) or, if the processing has been paused, it resumes the processing on condition that the Pause signal has gone inactive (step S57).

3.6 Transmission Header Creation Circuit and Transaction Control Circuit

Figure 23:
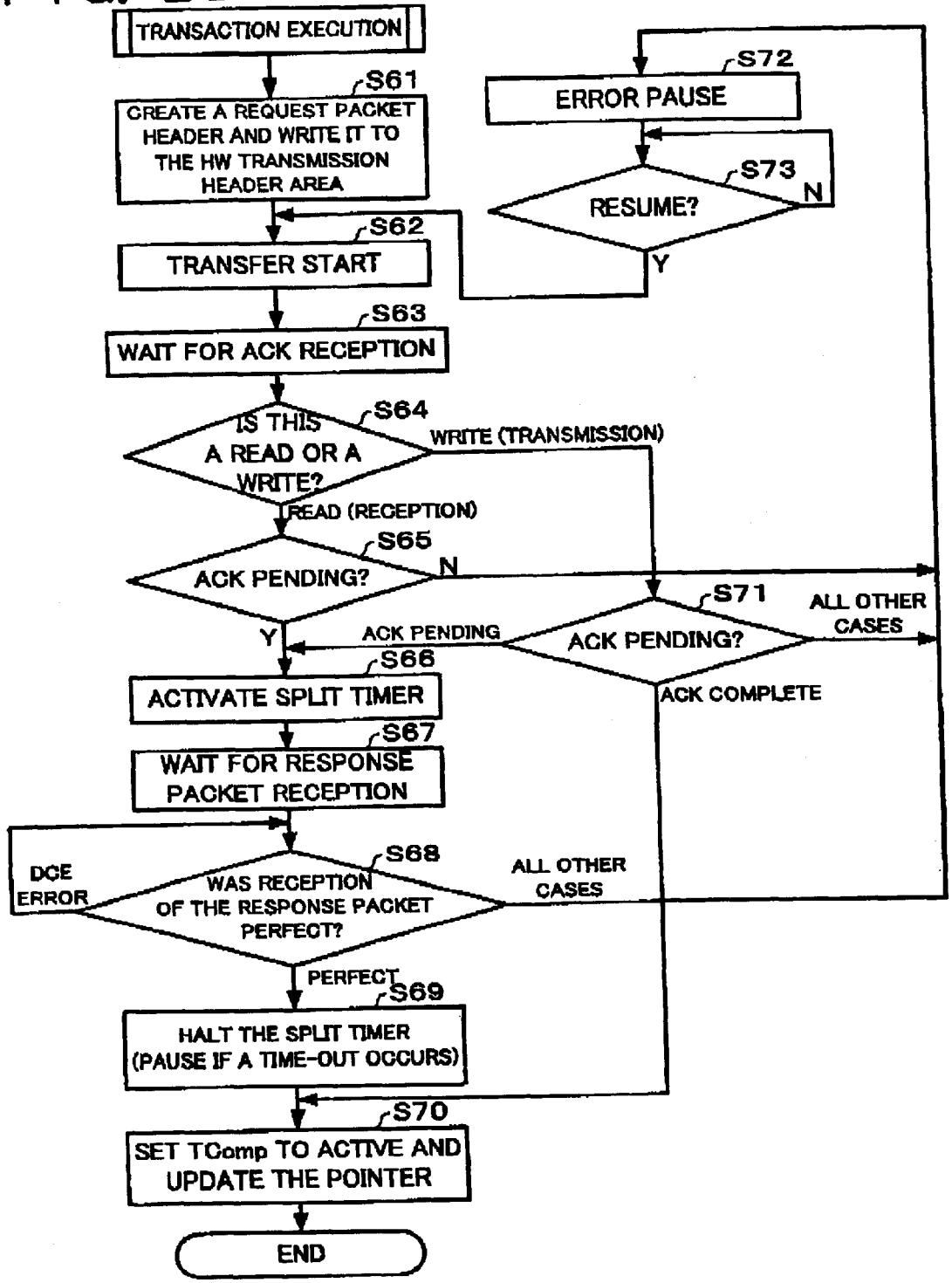
FIG. 23 is a flowchart illustrating the operation of the transmission header creation circuit and the transaction control circuit.

The operation of the transmission header creation circuit 260 and the transaction control circuit 270 will now be described, with reference to the flowchart of FIG. 23.

The transmission header creation circuit 260 first creates a request packet header and writes it to the HW transmission header area (AR3 of FIG. 8) (step S61). More specifically, if data is to be sent to the initiator as at A3 in FIG. 4, a header for a write request (block write request) packet is written to the HW transmission header area. If data is to be received from the initiator as at B1 in FIG. 5 or if a page table is to be fetched as shown in FIG. 12, on the other hand, a header for a read request packet is written to the HW transmission header area.

A transfer start signal (HWStart) is then made active to instruct the start of the transfer (step S62) and waits from an ACK from the initiator (step S63).

If the transmission packet was a read request packet, the transaction control circuit 270 determines whether or not the status is ACK pending (step S65) and, if the status is not ACK pending, the flow proceeds to step S72 to set an error pause state. If the status is ACK pending, on the other hand, the transaction control circuit 270 instructs the activation of the split timer (step S66) and waits for the reception of a response packet (step S67).

The transaction control circuit 270 then determines whether or not the reception of the response packet was perfect (step S68). If there is a DCE error, it waits again for the reception of a response packet; or if the reception was perfect, the flow proceeds to step S69; or in all other cases the flow proceeds to step S72 to set the error pause state. If the flow has branched to step S69, the split timer is instructed to stop, the Tcomp signal is made active and the transfer data pointer is updated (step S70).

If the transmission packet was a write request packet, on the other hand, the transaction control circuit 270 first determines whether or not the status is ACK pending (step S71). If the status is ACK pending, the flow proceeds to step S66; if the status is ACK complete, the flow proceeds to step S70; and in all other cases, the flow proceeds to step S72 to set the error pause state.

Note that if the flow has branched to step S72 and the error pause state has been set, the flow proceeds to step S62 on condition that processing has been resumed (step S73). In other words, the transmission header that has already been written to the HW transmission header area is re-used and the transfer restarts.

This embodiment of the present invention ensures that, if a page table exists in the data buffer of the initiator, that page table is fetched; if the page table does not exist, a virtual page table is created. The execution of the data transfer is based on the thus fetched or created page table. This ensures that the transfer execution processing can be made common after the page table has been fetched or created. In other words, details of the processing performed by the transfer execution control circuit 240, payload division circuit 250, the transmission header creation circuit 260, and the transaction control circuit 270 are the sane, regardless of whether the page table was created or fetched, as described with reference to FIGS. 21, 22, and 23. It is therefore not necessary to provide both circuitry for use when the page table has been fetched and circuitry for use when the page table has been created, within these circuit blocks, thus simplifying the processing and reducing the size of the circuitry.

With this embodiment of the invention, a virtual page table is created in such a manner that the number of page table elements between the page boundaries PB1 and PB4 (between the Kth and Lth page boundaries) is one (a predetermined number). It is therefore possible to reduce the page table size to a minimum (such as three pages or less). This enables a saving in the amount of storage used by the HW page table area for storing the page table. This makes it possible to implement high-speed data transfer while observing the restriction on traversing page boundaries within the data buffer on the initiator side, as shown in FIG. 15, even if there is no page table at the initiator and addresses are specified by a direct addressing method.

With this embodiment of the invention, the HW page table area at AR1 of FIG. 8 and the registers 224 and 226 for the page table address and page table size in FIG. 10 can be used in common. Thus the processing of the circuit blocks and the processing of the firmware can be simplified.

This embodiment of the invention also makes it possible to use hardware to automate the processing shown at A3 in FIG. 4 and B1 in FIG. 5. In other words, if the firmware instructs the start of continuous transfer processing (by writing 1 to the register 202 of FIG. 10), the hardware of the SBP-2 core 84 automatically executes page table fetch or creation processing, payload division processing, transmission header processing, transfer start processing for each packet, and error processing, to transfer a series of packets automatically. This therefore enables a huge reduction in the processing load on the firmware, enabling a large improvement in the actual transfer speed of the data transfer control device.

4. Separation of Data Areas (Separation into ORB Area and Stream Area)

With this embodiment of the invention, the RAM 80 (packet storage means) of FIG. 7 is divided into header areas (AR2, AR3, AR4, AR6) and data areas (AR5, AR7, AR8, AR9), as shown in FIG. 8, and also the data areas are divided into ORB areas (AR5 and AR7) and stream areas (AR8 and AR9).

In other words, the division of the RAM into header and data areas makes it possible for the firmware to read out headers sequentially from the header areas and write headers sequentially to the header areas. This has the advantage of reducing the processing load on the firmware to a certain extent. From the view point of speeding up the data transfer even further, however, it has become clear that it is not sufficient simply to separate the header areas from the data areas.

Figure 24A:
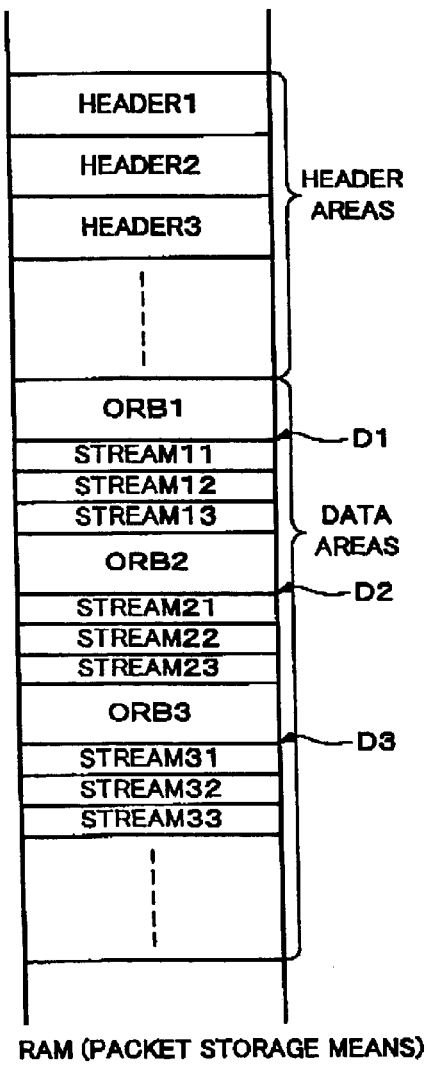
FIGS. 24A and 24B illustrate techniques of separating the data areas into ORB areas and stream areas.

As shown by way of example in FIG. 24A, a packet could be divided into headers and data, with headers 1, 2, and 3 stored in header areas and data 1, 2, and 3 stored in data areas.

In such a case, the data consists of ORBs for the SBP-2 (first layer) and streams for the application layer (second layer) that is an upper layer, as previously described. With the header and data areas in RAM being simply separated, however, the ORBs and streams will become mixed in the data areas, as shown at D1, D2, and D3 in FIG. 24A.

For that reason, the processing described below is necessary when transferring streams of data from RAM to an application-layer device. First of all, the data pointer is set to the D1 position and streams 11, 12, and 13 are read out, then the data pointer is changed to the D2 position and streams 21, 22, and 23 are readout. The data pointer is subsequently changed to the D3 position and streams 31, 32, and 33 are read out.

Simply separating the RAM into header and data areas in this fashion makes it necessary to control the switching of the data pointer position in a complex manner during the transfer of the streams to the application-layer device, which leads to complicated processing and an increase in the scale of the circuitry. In addition, it is not possible to read out the streams sequentially from the data areas, so the actual transfer speed of the data transfer control device cannot be increased by much.

Figure 24B:
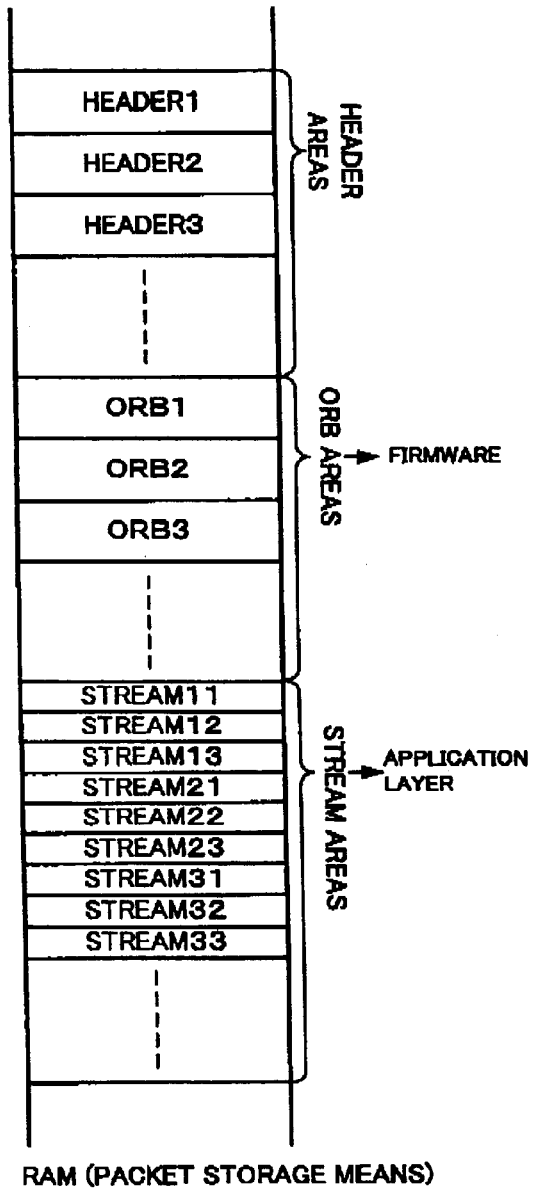
Figure 25:
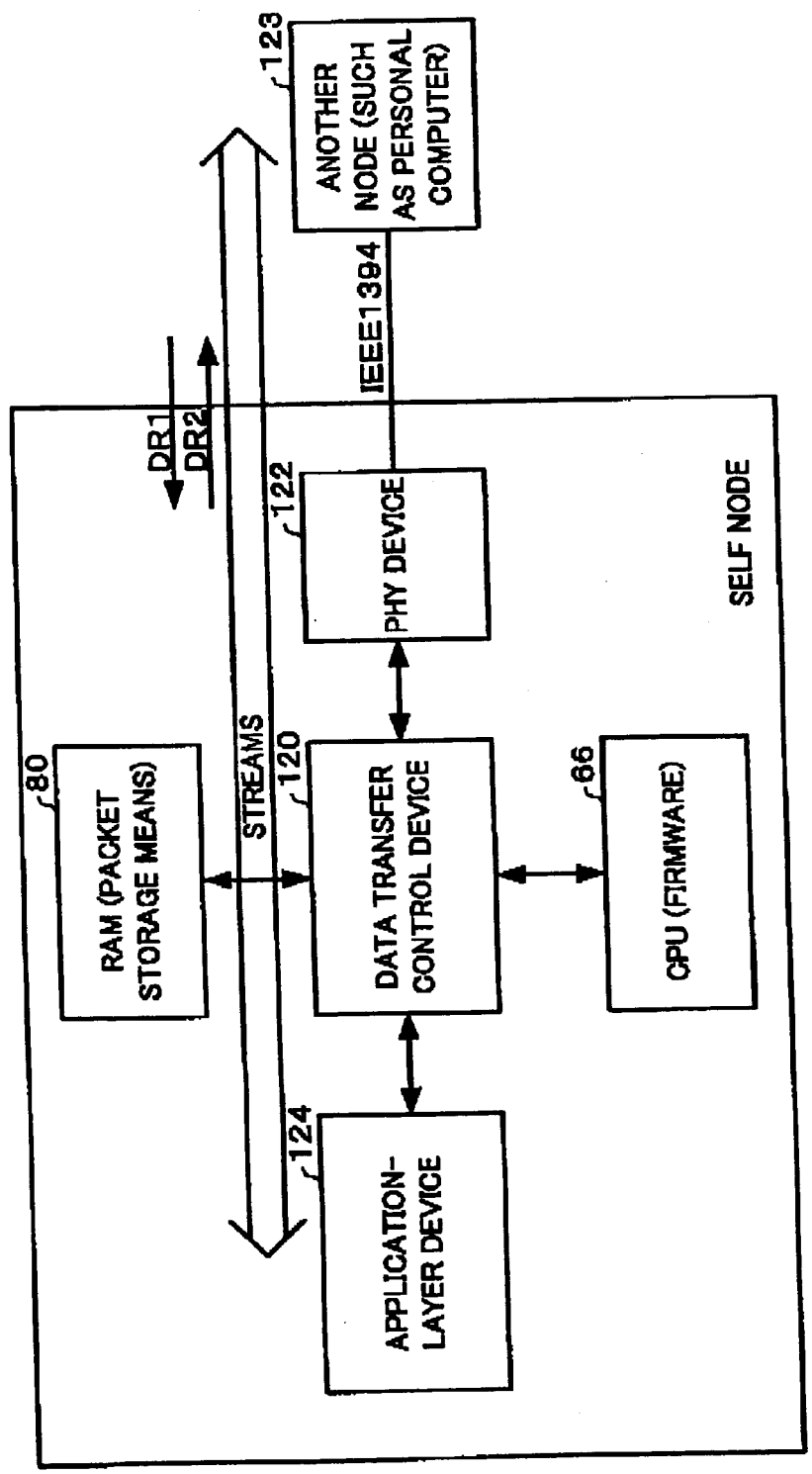
FIG. 25 shows the state of stream transfer between another node and an application-layer device.

The data areas could be separated into ORB areas and stream areas, as shown in FIG. 24B. Such a configuration makes it possible for the firmware to read out the ORBs 1, 2, and 3 sequentially from the ORB area. In addition, the previously described functions of the SBP-2 core 84 can be utilized to read out the streams 11 to 33 sequentially from the stream area, without intervention from the firmware, and transfer them to the application-layer device. In other words, it is possible to transfer streams (such as print data) between another node 123 (such as a personal computer) and an application-layer device (such as a device that processes print data for a printer), without the intervention of the firmware (CPU) 66, as shown in FIG. 25. As a result, the processing load on the firmware can be greatly reduced in comparison with the case shown in FIG. 24A, and also the data transfer can be made far faster.

Note that separating the data area into a transmission ORB area (AR7 of FIG. 8) and a transmission stream area (AR8) will increase the speed of data transfers. In other words, the speed of data transfer can be increased not only when streams are transferred from the other node 123 to the device 124 (self node) in the direction indicated by DR1 in FIG. 25, but also when streams are transferred from the application-layer device 124 to the other node 123 in the direction indicated by DR2.

5. Utilization of Transaction Label To Switch Write Areas

Under IEEE 1394, an object called a transaction label t1 is used as information for identifying each transaction.

In other words, a transaction requesting node includes this transaction label t1 within the request packet and sends it to the responding node. On receiving this request packet, the responding node includes the same t1 in the response packet and sends it back to the requesting node. The requesting node can identify that this response packet is in response to a transaction requested by itself, by checking the t1 within the returned response packet.

It is sufficient to ensure that the transaction label t1 has a unique relationship with respect to the responding node. More specifically, if a requesting node ND1 has issued a transaction with t1=TN1 to a responding node ND2, it is not possible for the requesting node ND1 to issue another transaction with t1=TN1 to the responding node ND2 while that transaction remains completed. In other words, each transaction is uniquely specified by the transaction label t1, a source ID, and a destination ID. Conversely, the transaction label t1 can have any value and other nodes must be able to receive any value of t1, provided the above restriction is respected.

When the requesting node has sent a request packet and is waiting for a response packet, the processing that is performed when the response packet arrives has already been determined. In this case, this embodiment of the invention uses a technique for drawing attention to the nature of the transaction label t1, as described below.

Figure 26A:
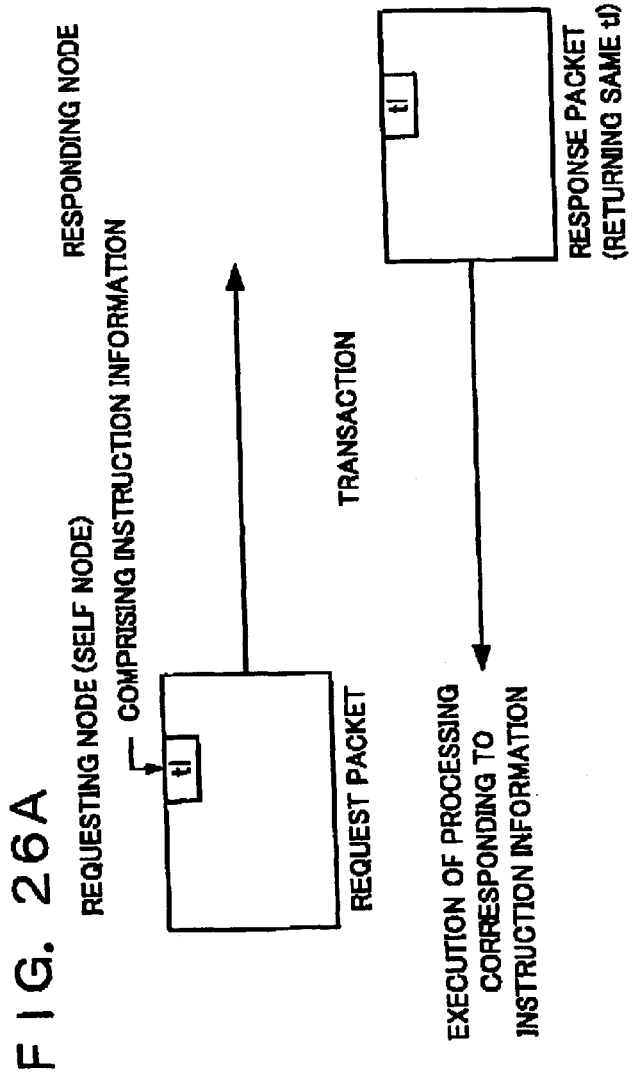
FIGS. 26A and 26B illustrate the transaction label.

When the requesting node sends a request packet for starting a transaction to the responding node, instruction information indicating the processing to be performed when the response packet is returned is comprised within the transaction label t1 (broadly speaking, transaction identification information) in the request packet, as shown in FIG. 26A. The configuration is such that the processing corresponding to the instruction information comprised within t1 is executed when the response packet is received from the responding node.

This ensures that the processing corresponding to the instruction information comprised within t1 can be executed by the SBP-2 core 84 and other hardware when the response packet is returned, without involving the firmware. This enables reductions in the processing load on the firmware, and also tends to increase data transfer speeds.

More specifically, when a response packet is received from the responding node in accordance with this embodiment of the invention, that response packet is stored in the area specified by the instruction information comprised within t1.

Figure 26B:
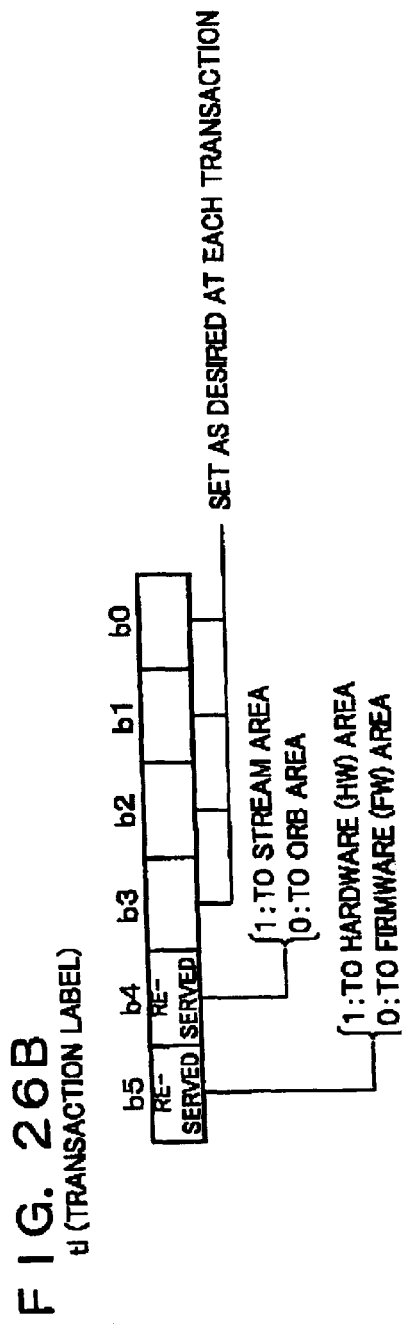

In other words, bits 5 and 4 of the transaction label t1 are reserved bits used to express the instruction information, as shown in FIG. 26B.

If the returned response packet is to be written to the hardware (HW) area, bit 5 of t1 of the request packet is set to 1 and it is sent to the responding node. If the returned response packet is to be written to the firmware (FW) area, on the other hand, bit 5 of t1 of the request packet is set to 0 and it is sent to the responding node.

If the returned response packet is to be written to the stream area, bit 4 of t1 of the request packet is set to 1 and it is sent to the responding node. If the returned response packet is to be written to the ORB area, bit 4 of t1 of the request packet is set to 0 for transmission to the responding node.

Figure 27:
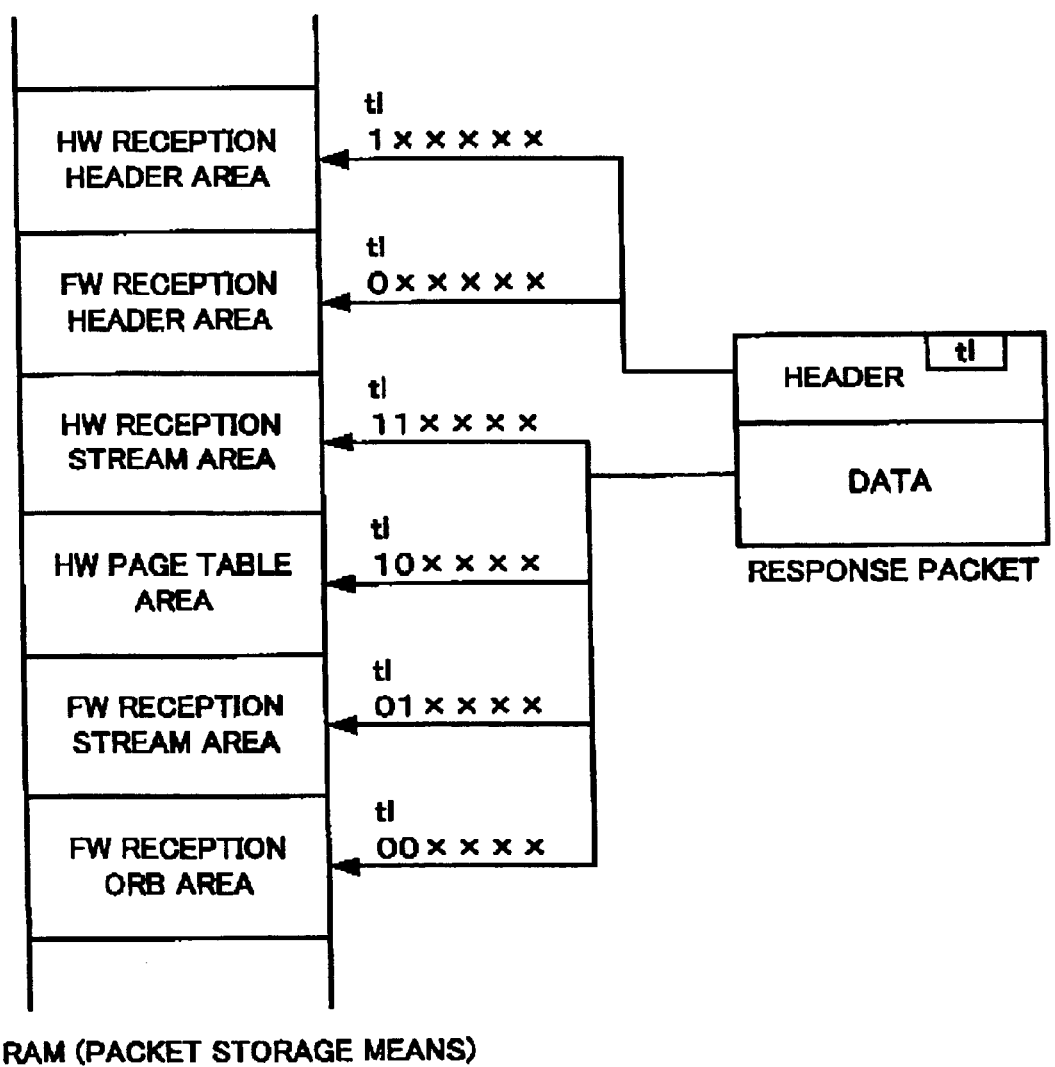
FIG. 27 illustrates a technique of writing a header and data of a packet to different areas in RAM, using the transaction label.

This makes it possible to ensure that the header and data of the response packet are written to the corresponding areas shown in FIG. 27, when the response packet is returned.

In other words, if t1=1xxxxx (where "x" means "don't care"), the header of the response packet is written to the HW reception header area, but if t1=0xxxxx, it is written to the FW reception header area.

Similarly, if t1=11xxxx, the data of the response packet is written to the HW reception stream area, but if t1=10xxxx, it is written to the HW page table area. If t1=01xxxx, the data of the response packet is written to the FW reception stream area, but if t1=00xxxx, it is written to the FW reception ORB area.

This arrangement ensures that the header and data of a packet can be written automatically to the corresponding areas in RAM, without intervention from the firmware. The configuration of the hardware that writes the response packet into RAM can be simplified, leading to a reduction in the size of the data transfer control device.

As described with reference to FIG. 24B, the writing of packet headers to the header areas, ORBs to the ORB areas, and streams to the stream areas can be done automatically, which simplifies the hardware processing and promotes faster data transfer.

6. Electronic Equipment

The description now turns to examples of electronic equipment comprising the data transfer control device of this embodiment.

Figure 28A:
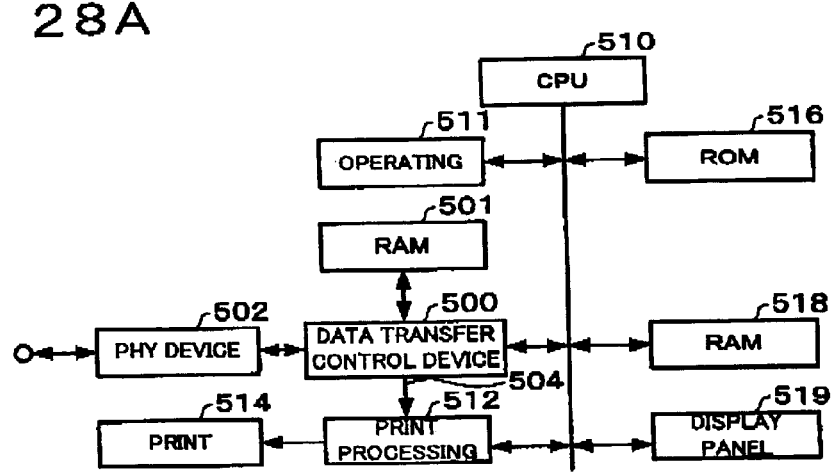
FIGS. 28A, 28B, and 28C show examples of the internal block diagrams of various items of electronic equipment.
Figure 29A:
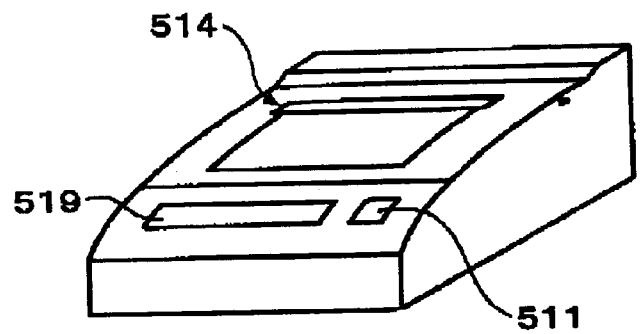
FIGS. 29A, 29B, and 29C show external views of various items of electronic equipment.

An internal block diagram of a printer that is one example of such electronic equipment is shown in FIG. 28A with an external view thereof being shown in FIG. 29A. A CPU (microcomputer) 510 has various functions, including that of controlling the entire system. An operating section 511 is designed to allow the user to operate the printer. Data such as a control program and fonts is stored in a ROM 516, and a RAM 518 functions as a work area for the CPU 510. A display panel 519 is designed to inform the user of the operational state of the printer.

Print data that is sent from another node, such as a personal computer, through a PHY device 502 and a data transfer control device 500 is sent directly to a print processing section 512 over a bus 504. The print data is subjected to given processing by the print processing section 512 and is output for printing to paper by a print section (a device for outputting data) 514.

Figure 28B:
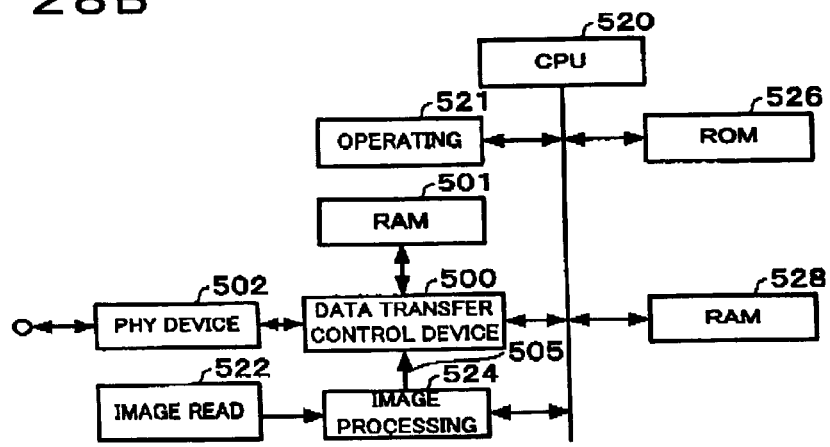
Figure 29B:
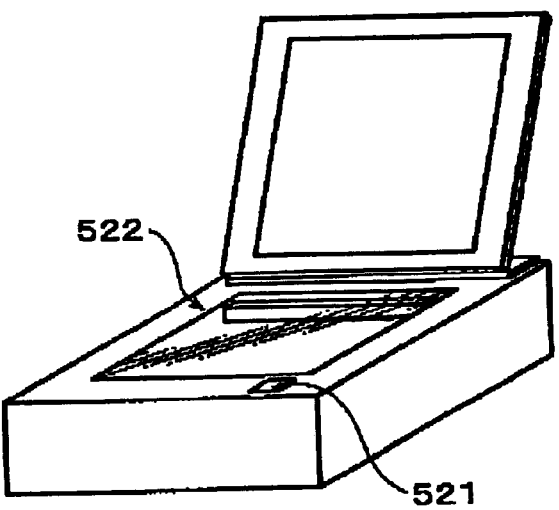

An internal block diagram of a scanner that is another example of electronic equipment is shown in FIG. 28B with an external view thereof being shown in FIG. 29B. An operating section 521 is designed to allow the user to operate the scanner. Data such as a control program is stored in a ROM 526 and a RAM 528 functions as a work area for the CPU 520.

An image of a document is read in by an image read section (a device for fetching data) 522, which comprises components such as a light source and an opto-electric converter, and data of the read-in image is processed by an image processing section 524. The processed image data is sent directly to the data transfer control device 500 over a bus 505. The data transfer control device 500 creates packets by attaching headers and the like to this image data, then sends those packets through the PHY device 502 to another node such as a personal computer.

Figure 28C:
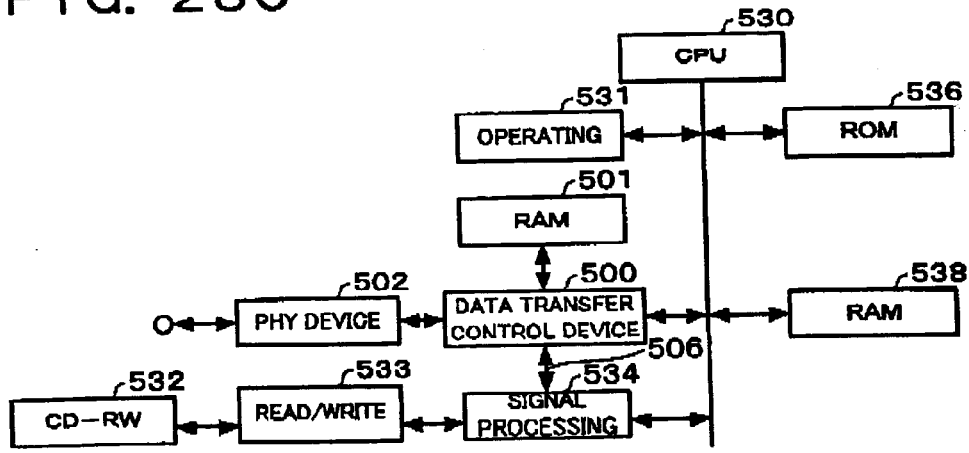
Figure 29C:
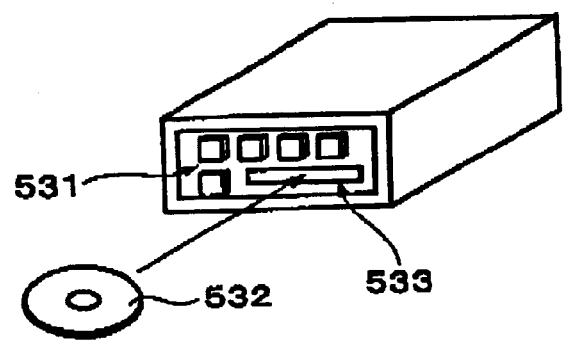

An internal block diagram of a CD-RW drive that is a further example of electronic equipment is shown in FIG. 28C with an external view thereof being shown in FIG. 29C. A CPU 530 has various functions, including that of controlling the entire system. An operating section 531 is designed to allow the user to operate the CD-RW. Data such as a control program is stored in a ROM 536 and a RAM 538 functions as a work area for the CPU 530.

Data read out from a CD-RW 532 by a read/write section (a device for fetching data or a device for storing data) 533, which comprises components such as a laser, a motor, and an optical system, is input to a signal processing section 534 where it is subjected to given signal processing such as error correction. The data transfer control device 500 creates packets by attaching headers and the like to this data, then sends those packets through the PHY device 502 to another node such as a personal computer.

Data that has been sent in from another node through the PHY device 502 and the data transfer control device 500, on the other hand, is sent directly to the signal processing section 534 over the bus 506. The data is subjected to given signal processing by the signal processing section 534 then is stored by a read/write section 533 in the CD-RW 532.

Note that another CPU could be provided to enable data transfer control by the data transfer control device 500, in addition to the CPU 510, 520, or 530 of FIG. 28A, 28B, or 28C.

In addition, a RAM 501 (equivalent to the RAM 80 of FIG. 7) is shown provided outside the data transfer control device 500 in FIGS. 28A, 28B, and 28C, but the RAM 501 could equally well be provided within the data transfer control device 500.

Use of the data transfer control device of this embodiment in electronic equipment makes it possible to perform high-speed data transfer. Therefore, if a user wishes to order a printout from a personal computer or the like, the printout can be completed with only a small time lag. Similarly, a user can see a scanned image with only a small time lag after instructing the scanner to take an image. It is also possible to read data from a CD-RW or write data to a CD-RW at high speeds. The present invention also makes it simple to use a plurality of items of electronic equipment connected to one host system or a plurality of items of electronic equipment connected to a plurality of host systems, for example.

Use of the data transfer control device of this embodiment of the invention in electronic equipment also reduces the processing load on firmware running on the CPU, making it possible to use an inexpensive CPU and low-speed buses. This enables further reductions in the cost and size of the data transfer control device, thus reducing the cost and size of the electronic equipment.

Note that the electronic equipment that can employ a data transfer control device in accordance with the present invention is not limited to the above described embodiments, and thus that various other examples can be considered, such as various types of optical disk drive (CD-ROM or DVD), magneto-optic disk drives (MO), hard disk drives, TVs, VCRs, video cameras, audio equipment, telephones, projectors, personal computers, electronic note books, and dedicated wordprocessors.

Note also that the present invention is not limited to the embodiments described herein, and various modifications are possible within the scope of the invention laid out herein.

For example, the configuration of the data transfer control device in accordance with the present invention is preferably that as shown in FIG. 7, but it is not limited thereto.

The technique of creating the page table by the page table creation circuit is most preferably that described with reference to FIGS. 13 to 20B, but the present invention is not limited thereto and thus a virtual page table can be created by hardware, based on at least page boundary information.

Similarly, the configuration of the transfer execution circuit (SBP-2 core) is most preferably that as shown in FIG. 10, but the present invention is not limited thereto and thus any circuitry can be used to divide transfer data into packets for transmission, at least provided that the transfer data does not traverse page boundaries.

The techniques used for creating the page table that were described with reference to FIGS. 13 to 20B are most preferably implemented in hardware (by circuitry), but they could also be implemented by software.

Furthermore, the techniques used for separating packets, writing packets to different areas in a packet storage means, and reading out data are also not limited to those described with reference to FIGS. 8 and 24B.

In addition, it is particularly preferable that the first data is data for the transaction layer and the second data is data for the application layer, but the first and second data items in accordance with the present invention are not limited thereto.

Similarly, the present invention is preferably applied to data transfer as defined by the IEEE 1394 standard, but it is not limited thereto. For example, the present invention can also be applied to data transfer in accordance with standards that are based on a similar concept to that of IEEE 1394 or standards that are developed from IEEE 1394.

What is claimed is:

1. A data transfer control device for transferring data among a plurality of nodes that are connected to a bus, the data transfer control device comprising:
    a page table fetch circuit that operates when a page table exists in a storage means of another node, to fetch the page table from the other node;
    a page table creation circuit that operates when no page table exists in a storage means of the other node, to create a virtual page table based on page boundary information; and
    a transfer execution circuit which executes processing to divide transfer data into packets that do not traverse page boundaries, based on the thus fetched or created page table, and transmit the packets.

2. The data transfer control device as defined in claim 1, wherein, when a processing means has issued a transfer start command:
    the page table fetch circuit executes processing to automatically fetch a page table or the page table creation circuit executes processing to automatically create a page table; and
    the transfer execution circuit executes processing to automatically divide transfer data equivalent of a page table into a series of packets and transfer the thus-divided series of packets continuously.

3. The data transfer control device as defined in claim 1, further comprising:
    a payload division circuit for dividing transfer data into packets of a payload size, based on page table element information possessed by a page table.

4. The data transfer control device as defined in claim 1, further comprising:
    randomly accessible packet storage means having a control information area for storing packet control information and a data area for storing packet data,
    wherein the data area of the packet storage means is separated into a first data area for storing first data for a first layer and a second data area for storing second data for a second layer that is the object of continuous packet transfer by the transfer execution circuit.

5. The data transfer control device as defined in claim 4, wherein, when a request packet for starting a transaction is transmitted to another node, instruction information for instructing the processing to be performed when a response packet will be received from the other node is comprised within transaction identification information in the requests packet; and
    wherein, when the response packet is received from the other node, control information and first and second data of the response packet are respectively written to the control information area and the first and second data areas, based on the instruction information comprised within the transaction identification information in the response packet.

6. The data transfer control device as defined in claim 1, further comprising randomly accessible packet storage means,
    wherein the packet storage means comprises a page table area in which a fetched page table is stored when a page table has been fetched, or a created page table is stored when a page table has been created.

7. The data transfer control device as defined in claim 1, further comprising:
    a page table size register for indicating the size of a fetched page table when a page table has been fetched, or the size of a created page table when a page table has been created.

8. A data transfer control device for transferring data among a plurality of nodes that are connected to a bus, the data transfer control device comprising:

a page table creation means for creating a page table having a predetermined number of page table elements between Kth and Lth page boundaries of a storage means of another node, when the start address of transfer data lies between (K−1)th and Kth page boundaries or on the Kth page boundary and when the end address of the transfer data lies between Lth and (L+1)th page boundaries or on the Lth page boundary; and transfer execution means for executing processing to divide transfer data into packets that do not traverse page boundaries, based on the thus created page table, and transmit the packets.

9. The data transfer control device as defined in claim 8, further comprising:

a payload division means for dividing transfer data into packets of a payload size the maximum value of which is divisor of the page boundary size.

10. The data transfer control device as defined in claim 8, wherein the page table creation means creates a page table such that, when the start address of transfer data is between the (K−1)th and Kth page boundaries and the end address of the transfer data is between the Lth and (L+1)th page boundaries, a portion between the start address and the Kth page boundary is a first page table element, a portion between the Kth and Lth page boundaries is a second page table element, and a portion between the Lth page boundary and the end address is a third page table element.

11. The data transfer control device as defined in claim 8, wherein the page table creation means creates a page table such that, when the start address of transfer data is between the (K−1)th and Kth page boundaries and the end address of the transfer data is between the (K−1)th and Kth page boundaries or on the Kth page boundary, a portion between the start address and the end address is a first page table element.

12. The data transfer control device as defined in claim 8, wherein the page table creation means creates a page table such that, when the start address of transfer data is between the (K−1)th and Kth page boundaries and the end address of the transfer data is beyond the Kth page boundary, a portion between the start address and the Kth page boundary is a first page table element, and subsequent page table elements are processed assuming that the start address lies on the Kth page boundary.

13. The data transfer control device as defined in claim 1, wherein data transfer is performed in accordance with the IEEE 1394 standard.

14. The data transfer control device as defined in claim 8, wherein data transfer is performed in accordance with the IEEE 1394 standard.

15. Electronic equipment comprising:

the data transfer control device as defined in claim 1;

a device for performing given processing on data that has been received from another node via the data transfer control device and the bus; and a device for outputting or storing data that has been subjected to the processing.

16. Electronic equipment comprising:

the data transfer control device as defined in claim 8;

a device for performing given processing on data that has been received from another node via the data transfer control device and the bus; and a device for outputting or storing data that has been subjected to the processing.

17. Electronic equipment comprising:

the data transfer control device as defined in claim 13;

a device for performing given processing on data that has been received from another node via the data transfer control device and the bus; and a device for outputting or storing data that has been subjected to the processing.

18. Electronic equipment comprising:

the data transfer control device as defined in claim 1;

a device for performing given processing on data that is to be transferred to another node via the data transfer control device and the bus; and a device for fetching data to be subjected to the processing.

19. Electronic equipment comprising:

the data transfer control device as defined in claim 8;

a device for performing given processing on data that is to be transferred to another node via the data transfer control device and the bus; and a device for fetching data to be subjected to the processing.

20. Electronic equipment comprising:

the data transfer control device as defined in claim 13;

a device for performing given processing on data that is to be transferred to another node via the data transfer control device and the bus; and a device for fetching data to be subjected to the processing.

* * * * *